(12) United States Patent
Bally et al.

(10) Patent No.: US 7,227,081 B2
(45) Date of Patent: Jun. 5, 2007

(54) OPEN MEDICAL SYSTEM

(75) Inventors: Alexander Bally, Barrington, RI (US); Gary M. Schindele, Montverde, FL (US); Tomio Kato, Norcross, GA (US); John P. Kasten, Lithia, FL (US)

(73) Assignee: Lifespan Healthcare, LLC, Tampa, FL (US)

( * ) Notice: Subject to any disclaimer, the term of this patent is extended or adjusted under 35 U.S.C. 154(b) by 0 days.

(21) Appl. No.: 11/051,434

(22) Filed: Feb. 4, 2005

(65) Prior Publication Data

US 2005/0167139 A1 Aug. 4, 2005

Related U.S. Application Data

(63) Continuation of application No. PCT/US03/24269, filed on Aug. 4, 2003, and a continuation-in-part of application No. 10/212,395, filed on Aug. 5, 2002.

(51) Int. Cl.
*H01H 9/02* (2006.01)
(52) U.S. Cl. ................ 174/53; 174/48; 52/28
(58) Field of Classification Search .......... 174/53, 174/48; 52/28
See application file for complete search history.

(56) References Cited

U.S. PATENT DOCUMENTS

| | | | |
|---|---|---|---|
| 3,032,057 A | 5/1962 | Mays | |
| 3,660,591 A | 5/1972 | Schultz | |
| 3,762,398 A | 10/1973 | Schefke et al. | |
| 3,769,502 A * | 10/1973 | Schultz et al. ......... | 362/85 |
| 3,921,345 A | 11/1975 | Damico | |
| 3,991,264 A * | 11/1976 | Connell ................. | 174/38 |
| 4,104,710 A | 8/1978 | Damico et al. | |
| D251,855 S | 5/1979 | Schindele | |
| D252,070 S | 6/1979 | Schindele | |
| D261,804 S | 11/1981 | Foster et al. | |
| 4,354,330 A * | 10/1982 | Schwartz ............... | 52/28 |
| 4,475,322 A * | 10/1984 | Russo et al. ........... | 52/27 |
| 4,498,693 A | 2/1985 | Schindele | |
| 4,807,659 A | 2/1989 | Schindele | |
| 4,821,470 A | 4/1989 | Kappers | |
| 4,869,378 A | 9/1989 | Miller | |
| 4,905,433 A | 3/1990 | Miller | |

(Continued)

OTHER PUBLICATIONS

Modular Services Co., Oklahoma City, OK 73105 Brochure/catalog titled: "Modular™ Columns" 8 pages, 1995.

(Continued)

*Primary Examiner*—Dhiru R. Patel
(74) *Attorney, Agent, or Firm*—Barlow, Josephs & Holmes, Ltd.

(57) ABSTRACT

An open medical system for deploying, supporting and organizing medical equipment and medical utilities includes a utility connection, and a main assembly having a primary structure having an upper plate and lower plate held in fixed spaced apart relation by a plurality of spacers, the main assembly also having at least one core, with each core having at least one utility outlet, the system having an open space bounded by the upper and lower plates and the inner surfaces of the outlets, which open space is free of utility outlets. Equipment rails are connected between the spacers to support medical equipment. A rotating base assembly may be used to support the system, and to restrict rotation.

10 Claims, 22 Drawing Sheets

U.S. PATENT DOCUMENTS

| | | |
|---|---|---|
| 4,907,767 A | 3/1990 | Corsi |
| 4,942,271 A | 7/1990 | Corsi |
| 5,007,688 A | 4/1991 | Bayerlein et al. |
| 5,072,906 A | 12/1991 | Foster |
| 5,077,843 A | 1/1992 | Foster |
| 5,107,636 A * | 4/1992 | Schindele et al. ............ 52/27 |
| 5,186,337 A | 2/1993 | Foster |
| 5,247,962 A | 9/1993 | Walker |
| 5,284,255 A | 2/1994 | Foster |
| 5,299,338 A | 4/1994 | Foster |
| 5,398,359 A | 3/1995 | Foster |
| 5,480,212 A | 1/1996 | Marconet |
| 5,490,652 A | 2/1996 | Martin |
| 5,515,659 A * | 5/1996 | MacDonald et al. .......... 52/474 |
| 5,553,892 A | 9/1996 | Pitchford |
| 5,618,090 A | 4/1997 | Montague |
| 5,644,876 A | 7/1997 | Walker |
| 5,756,933 A | 5/1998 | Pitchford |
| 5,878,536 A | 3/1999 | Demmitt |
| 5,890,326 A | 4/1999 | Gallant |
| 5,921,795 A | 7/1999 | Weener |
| D418,603 S | 1/2000 | Gallant |
| 6,084,180 A | 7/2000 | DeBartolo, Jr. |
| 6,095,468 A | 8/2000 | Chirico |
| 6,096,025 A | 8/2000 | Borders |
| 6,196,649 B1 | 3/2001 | Block |
| 6,213,481 B1 | 4/2001 | Marchese |
| 6,256,935 B1 | 7/2001 | Walker |
| 6,269,594 B1 | 8/2001 | Walker |
| 6,311,440 B1 | 11/2001 | Feldpausch |
| 6,360,389 B1 | 3/2002 | Gallant |
| 6,495,895 B1 | 12/2002 | Peterson et al. |

OTHER PUBLICATIONS

MEDEAS Medical Architectural & Engineered Systems; Norcross, GA Brochure/catalog titled: "Movable Critical Care Column" 6 pages.

MEDEAS Medical Architectural & Engineered Systems; Norcross, GA Brochure/catalog titled: "Movable Critical Care Column Architectural Specifications", 7 pages, 1995, Rev. Mar. 1996.

MEDEAS Medical Architectural & Engineered Systems; Norcross, GA Brochure/catalog titled: "Movable Critical Care Column Technical Data Sheet", 9 pages, 1995, Rev. Mar. 1996.

Modular Services Co., Oklahoma City, OK 73105 Drawing titled: "Open Access Dual Tower Model 5702; PR 5702 (May 6, 1996)"; 1 sheet.

Modular Services Co., Oklahoma City, OK 73105 Drawing titled: "Rectangular Column 5502; PR 5502 (May 8, 1996)"; 1 sheet.

Modular Services Co., Oklahoma City, OK 73105 Drawing titled: "Multi-Dimensional™ Column 5503; PR 5503 (May 8, 1996)"; 1 sheet.

Modular Services Co., Oklahoma City, OK 73105 Drawing titled: "Ceiling Column 5601; PR 5601 (May 8, 1996)"; 1 sheet.

International Preliminary Report on Patentability in International App. No. PCT/US03/24269; 4 sheets.

* cited by examiner

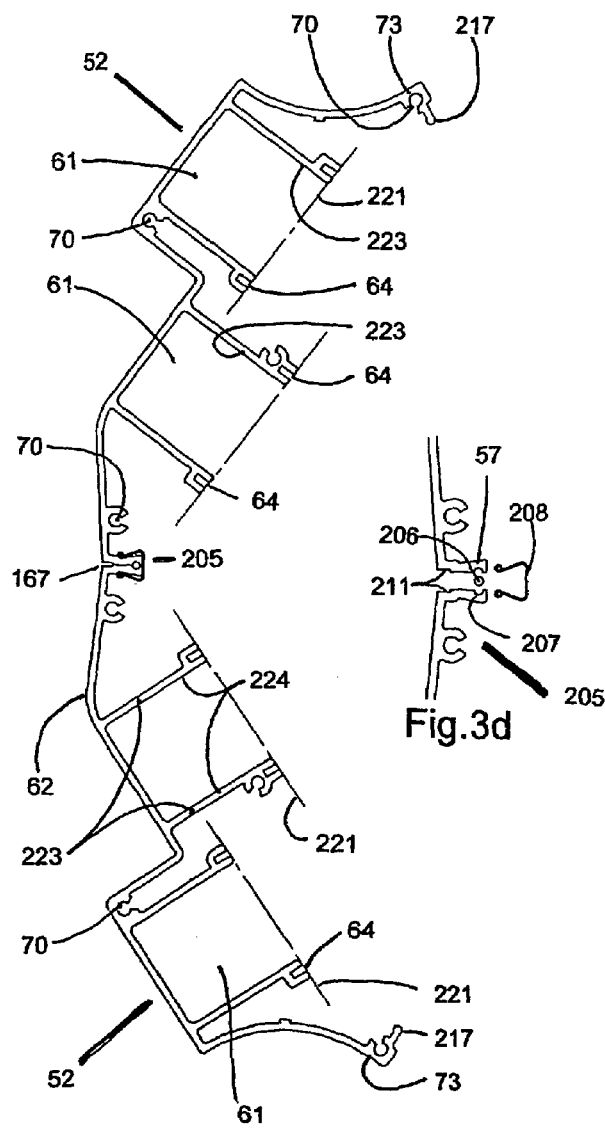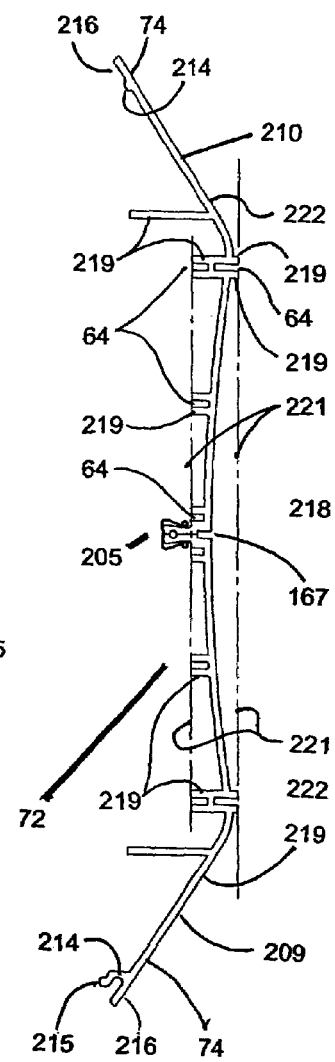
Fig.3b
Fig.3d
Fig.3c

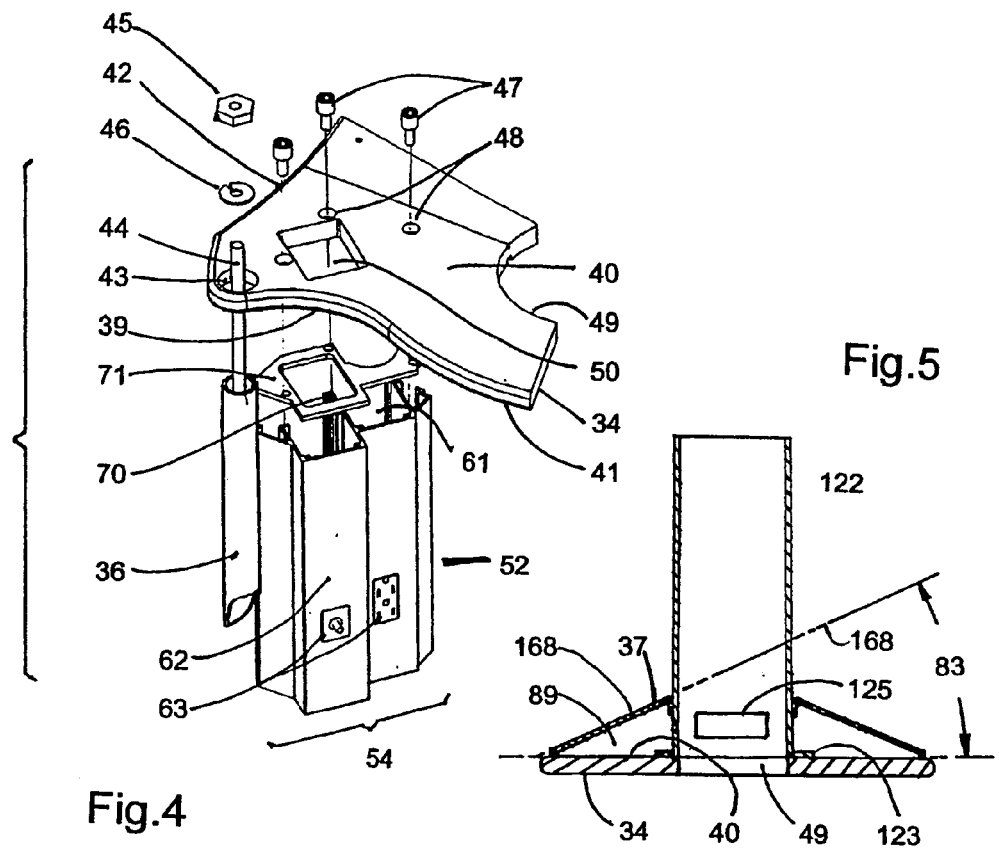
Fig.4
Fig.5
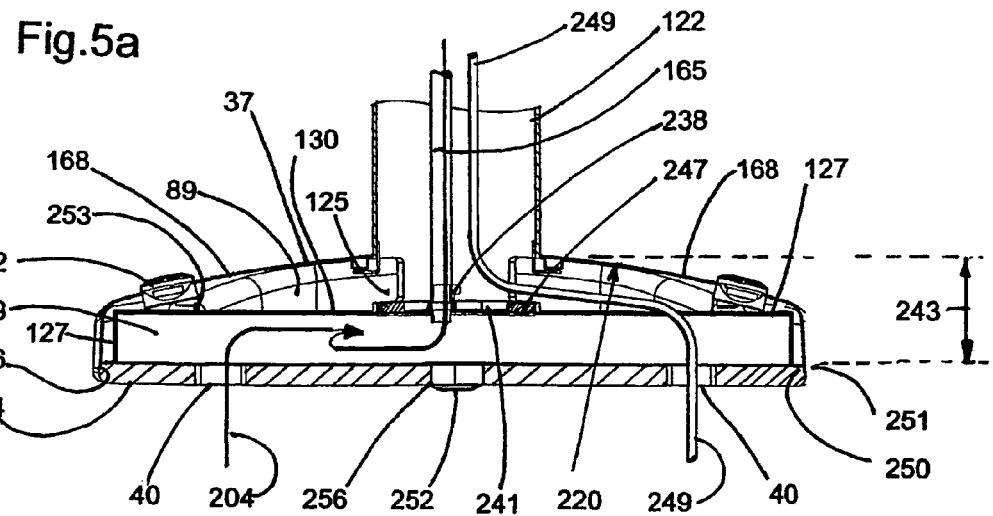
Fig.5a

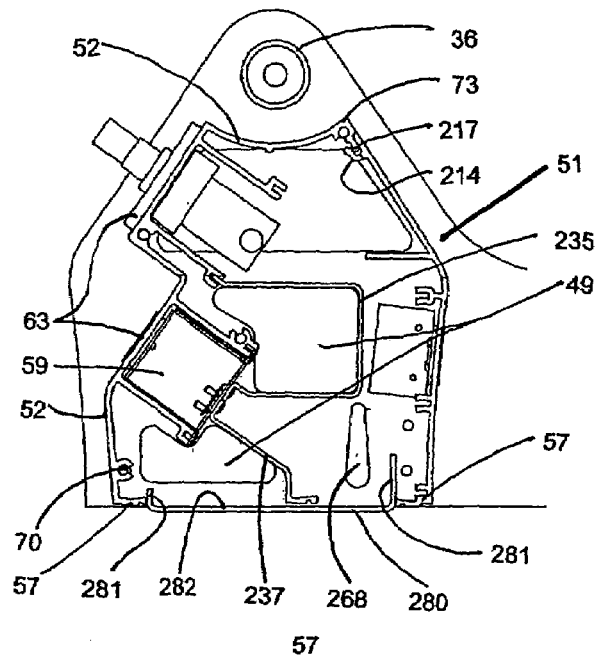
Fig.26a
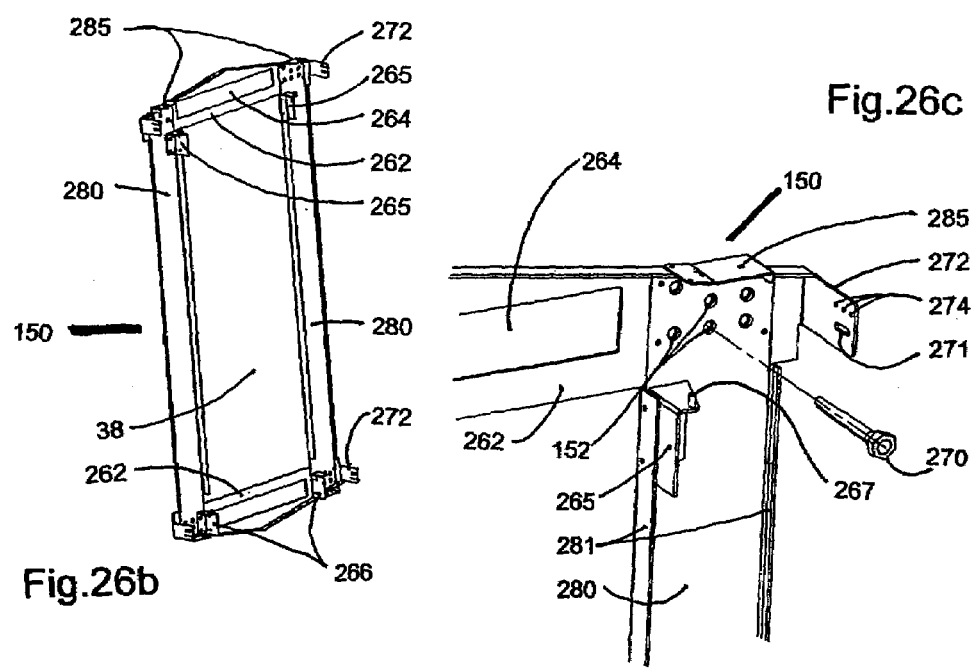
Fig.26b
Fig.26c

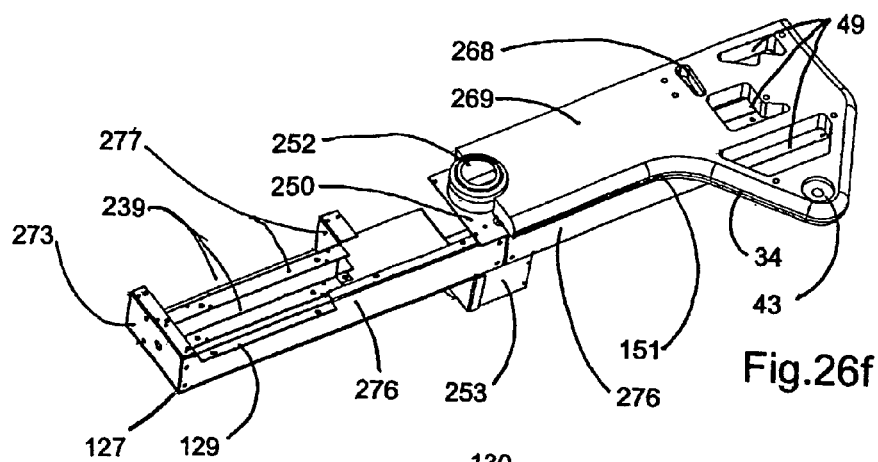
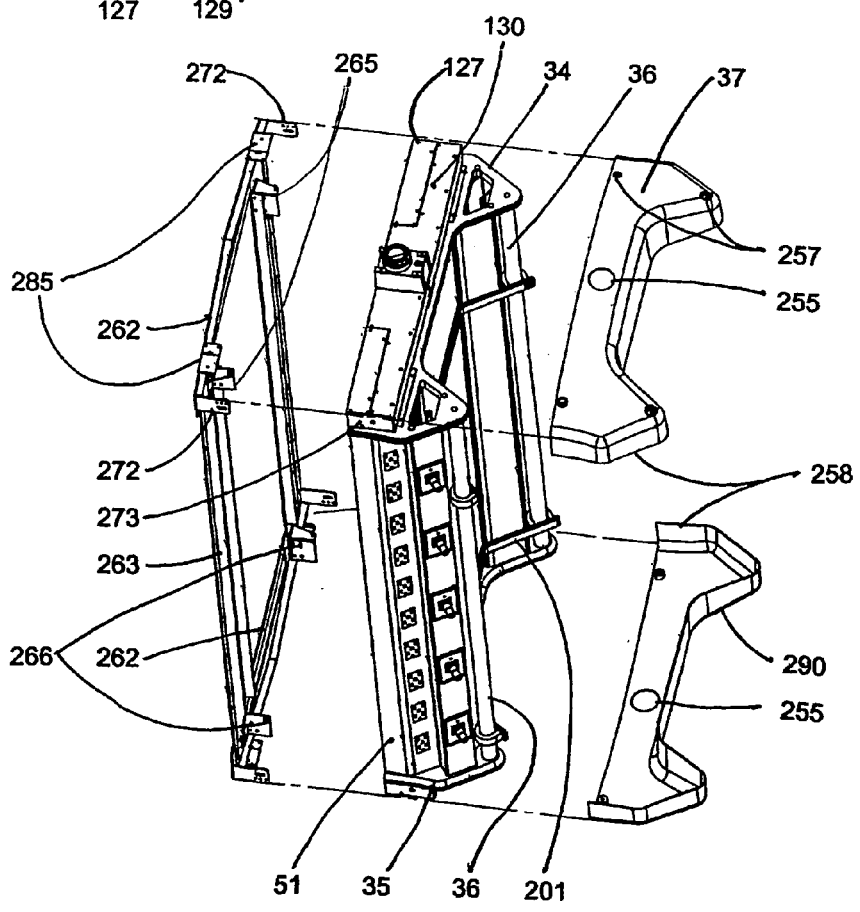

OPEN MEDICAL SYSTEM

Applicants claim priority based on the following applications, which are incorporated herein by this reference; This application is a continuation-in-part of currently pending U.S. patent application Ser. No. 10/212,395, titled Open Medical System, filed Aug. 5, 2002, and a continuation of PCT Patent Application Number PCT/US2003/024269, titled Open Medical System, filed Aug. 4, 2003.

BACKGROUND

This invention concerns systems for deploying, supporting and organizing medical equipment and essential medical utilities at a patient's bedside Medical treatment facilities deploy numerous and diverse bedside medical devices in support of seriously ill or injured patients. Many of these devices are connected to hospital utilities through wall outlets that deliver, for example oxygen, suction, compressed air, electric power, including standard and emergency power, low voltage electricity, nurse call lines, computer network connections, communications wiring, lighting, and similar utilities used in administering medical services at high levels of care.

Typical devices deployed bedside support therapies, diagnostics, monitoring, emergency intervention and communications. These include infusion pumps, blood warmers, oxygen catheters, suctioning devices, air/oxygen blenders, gas flow meters, sphygmomanometers, monitors for ECG, heart rate and blood pressure, emergency call buttons, nurse intercoms, telephones, computer terminals, and other devices. In addition, there is a corollary need for specialized storage, such as sharps containers, surgical gloves, catheters, and other items used in intensive patient care.

The devices and storage items used in intensive care are typically gathered into systems for their deployment, support and organization. Traditionally, such systems include headwall systems in both vertical and horizontal designs installed behind the patient bed to deliver hospital utilities such as gases, power, and communications through outlets located behind the head of the patient bed and flat against the wall. Headwall systems are expedient for routing utilities through walls, but they impede free access by care givers to both the patient's head and to the support equipment and utility outlets. Headwall systems are depicted in U.S. Pat. Nos. 5,553,982 and 5,756,933.

More recently, medical support equipment has been moved from the wall behind a patient's head and consolidated in cabinet-like structures placed next to the bed near a patient's head to conserve useable floor space, improve circulation in the room and provide access to the patient's head. These support systems include free standing systems with generally rectangular footprints, systems entirely suspended from articulated ceiling arms, and systems that are supported both from floor and ceiling, such as those depicted in U.S. Pat. Nos. 5,107,636 and 5,618,690. Utility outlets in such systems generally are presented to care givers in horizontal strips, with the devices or equipment attached externally to the system.

Treatment facilities for the intensive care of critically ill patients, such as medical, cardiac or neonatal intensive care units, are extremely stressful environments for care givers and patients. Increasing emphasis is being given to humanizing this environment by toning down the sight and sounds of complex equipment and, when possible, incorporating the attendance and psychological support of members of patients' families in the healing process of the critically ill.

Not surprisingly, the presence of family members is placing new emphasis on reducing visual clutter and noise levels in the layout and design of equipment at the patient's bedside. Existing support equipment is too overbearing, and the environment is too impersonal, noisy and frightening to make patients and family members feel at ease. Furthermore, the presence of family members makes circulation around beds, equipment and people much more difficult for the care giving staff. Presently available headwall system and free-standing or ceiling supported systems are inadequate for these new requirements. Specifically, present systems exemplified by U.S. Pat. No. 5,107,636, are large, bulky, angular and not user friendly because they expose the equipment they organize to the environment on all sides. Equipment generally is attached in such systems by means of straight, horizontal equipment rails positioned near the periphery of the main enclosure so the equipment projects beyond the systems' perimeter, significantly increasing the operational footprint of the system. Additionally, equipment attached externally to these systems in this manner is even more visually overwhelming and a hazard to the circulating staff.

Interpersonal communications among staff require visual and auditory contact across the room. Existing systems, exemplified by U.S. Pat. Nos. 5,107,636 and 5,618,690, provide open viewing passages through their interior space. These open areas, however, usually are traversed by many permanent structural elements and supports for equipment and outlets that effectively reduce this openness. Because of the permanent nature of such traversing structures and elements, the care giving staff has limited freedom in arranging these systems and can not always place equipment to achieve best productivity. If equipment is attached to such systems' equipment rails so it projects inward rather than out, the controls of these devices face inward away from the user, and access to them is further obstructed by the rail and mounting clamps.

It is crucial to reduce opportunities for error on the part of care givers, particularly under the stress of intensive patient care. In known systems, equipment is arranged based on a horizontal organizing principle, which may make it difficult to clearly distinguish equipment belonging to particular groupings such as a patient on the left or right side, or to a particular therapeutic procedure. This may increase the risk of error.

Furthermore, when outlets are contained in known horizontal raceways and strips, such as shown in U.S. Pat. Nos. 5,107,636 and 5,618,690, outward-facing electrical plugs, hanging cables and hanging hoses create a curtain that obstructs and obscures user access to the open area on the systems' interior. Typically, certain devices including flow meters and blenders are plugged directly into the gas outlets positioned in the outlet strips. When these devices project outward beyond the systems' footprint, they are exposed and vulnerable.

Infection control is another important issue in intensive patient care facilities. Present systems impede cleaning and the control of dust because they incorporate many permanent, horizontal frames, bars, channels, and structures where horizontal and cross members meet. Crevices at these joints can accumulate dust and are difficult to clean. Also, casters and wheels impede efficient floor cleaning, and top surfaces above eye level are typically not slanted for easy wiping access.

Cost is an essential issue in health care. Capital outlays for known systems are significant because these systems are large, heavy, complex, and do not offer the flexibility to be configured and reconfigured to support different levels of care and other applications. Installing known systems is costly when they require expensive articulated structures to connect them to the ceiling, or when they do not have a detachable floor mounting base or wall mounting bracket that enable rough-in installation without the entire, fully-assembled system being installed. Maintaining known systems can be costly because it is not easy to gain open access to the service side of all outlets and cable ways for replacement of outlets or to add a new circuit.

Moreover, productivity and work flow inefficiencies present other additional costs when known systems do not allow a facility or an individual care giver the freedom to arrange a work space as desired. Known systems do not allow easy upgrading, additions, modifications or re-deployment when other, greater or lesser levels of care are required.

Adjustability of systems is desirable to allow staff to position equipment where needed. Many known systems cannot be adjusted, provide no toe space for the user, and require an unsightly, laterally attached wiring chase extending to the ceiling. Other known systems are moveable, but require an elaborate, costly and visually imposing articulated structure to conduct utility lines from the ceiling, and a wheeled base that creates cleaning problems.

For the foregoing reasons, there is a need for a low cost, modular and versatile medical equipment and utilities system that contains support equipment and storage items associated with patient care within its perimeter, permits care givers to arrange equipment easily and quickly to support individual working styles, and allows equipment to be easily and meaningfully grouped and regrouped. There is a need for a system that conceals all utility cables and hoses, presents utility outlets at a user-friendly angle, and provides a means for attaching accessories that enable patient's families to personalize the bedside, permits easy access for on-site service, repair and expansion, and can be rapidly installed with minimum disruption of an existing facility.

SUMMARY

The present invention is directed to a system that satisfies the above described needs. The system comprises upper and lower horizontal plates held in fixed spaced apart relation by a plurality of spacers, and vertical utility cores with vertical outlet strips, located between the plates to leave an open space in the center portion of the system. The system is held at operating level by a base or ceiling support, and optionally can be made to rotate for easy adjustment. Equipment mounting rails can be clamped to the spacers internally in such a way that equipment and storage items attached to the rails are held within the footprint of the system, and can be easily arranged and re-arranged by the users as desired.

The system is configured from longitudinal, preferably extruded, vertical elements that allow the system to be scaled to any desired height. The vertical utility cores are comprised of base modules that increase ease of use and configurational flexibility. Optionally, modular panels can be installed by a user to divide the interior open space of the system into two separate alcoves for privacy, and to help absorb sound. Optional modular accessories can be attached to the system's vertical side panels to allow users and patients' families to humanize and personalize their environment Utility channels that house outlets are vertical and present outlets to the user at a user-friendly angle. A contoured cap facilitates infection control by keeping dust off the upper plate, and also serves as a distribution duct for ceiling-supplied utility service lines.

Alternatively, a contoured cap may also be added to the underside of the lower plate for these reasons and to conceal the fasteners used to attach the spacers to the lower plate. The upper and lower contoured caps can be used singly or in combination.

The contoured caps can also conceal and house lighting such as that used to provide task lighting within the open space of the column, down lighting appropriate for night lighting, or indirect up-lighting to reflect off the ceiling.

In a further alternative, the contoured cap can be made of two substantially identical modules, which reduces manufacturing costs, simplifies installation, and speeds service access. Contoured caps that are monolithic as well as caps that are comprised of two or more modules are within the scope of this invention. The cap also may be used either above the upper plate, below the lower plate, or both.

Auxiliary transoms may also serve to route lines to and between cores. Contoured equipment rails, and clamps that attach them to the vertical spacers, allow attachments of numerous medical devices and storage items clipped to the rails within the system's footprint. These elements permit care givers to arrange all equipment easily and quickly to support their individual working styles.

Attachment of the system to a recessed base provides toe space for the user and, in combination with a thin ceiling tube that conceals utility lines, the system presents a slender, non-imposing element in an equipment-intensive patient care facility. The distinctive vertical orientation of the two laterally arranged utility cores and its resulting left-right symmetry enables the care givers to identify each side of the system with a particular patient, while minimizing errors in associating equipment to the correct patient. Front-to-back symmetry has similar benefits and enables the system to be used as a partition between, for example, adjoining incubators.

Because the system is constructed from few, simple parts and features a simple rotating and indexing device, it can be manufactured at low cost. The system can be rapidly and cost-effectively installed on a fixed or rotating base with minimum disruption to an existing facility because a separable rough-in portion of the base can be pre-installed by the contractor and the fully-assembled structure can be placed later to complete the installation when the job site is clean. Large access openings and large access panels on each side of the system simplify and speed field installation and enable rapid, unimpeded access to all wiring devices and internal components for low-cost service, repair and upgrading.

The system has alternative embodiments that deploy, support and organize medical equipment and storage items associated with critical patient care. The alternative embodiments of this system can accommodate different levels of care, as well as different mounting means, including wall-mounted systems, ceiling-mounted arms and posts, and free-standing systems.

The alternative embodiments of this system can also accommodate alternative methods for segregating gas supply hoses from electric wiring, separating different types of electrical wiring as required in hospitals, supporting cost effective assembly in the factory, and facilitating quick and more accurate connection to hospital service lines.

This invention provides better care giver access to the utilities, while concealing connections, wires and hoses from the patient, and leaves space on the system's interior open to enhance visual and auditory communications between staff members, and to permit care givers to arrange and re-arrange equipment within the system. This is done, in part, by containing outlets within opposing cores of vertical orientation, with outlets facing toward the open interior of the system where support equipment is typically attached.

In order to achieve a high degree of flexibility and accommodate as many, diverse user needs as possible, many of the components of this invention, for example the cores, are modular and can be placed in several, useful arrangements such as, for example, with outlets facing outward and away from the open interior.

This invention accommodates equipment generally within the narrow footprint of the system, rather than having it extending out from the system, and improves movement around the column which helps improve response time of the staff during life saving intervention events.

Care givers can conveniently position and re-arrange equipment within the open area between the cores by using the contoured rails, rail mounting clamps and rail adapters.

The system's position can be adjusted relative to the patient by means of a low cost, user-friendly rotation mechanism located in the recessed support base for the system that also provides toe space for the user. The base can be split into two parts so that a rugged part of the base can be installed first to protect the rest of the system during construction. The base may be fitted with optional hospital utilities, such as dialysis connections.

Plenums located within the perimeter of the system rather than mounted externally on the end or side provide for easy connection of utility conduits and supply lines to the system, and for connection of the utilities to and between the cores of the system.

The system's modularization permits scalability to accommodate different sizes and numbers of medical equipment and utilities, and to permit easy installation of the system as a floor, ceiling or wall mounted system.

The cores and utility channels permit easy separation of utility types for regulatory approval of the system, and easy on-site expansion of the number of outlets, and enable free and rapid access to internal systems components for repair and installation of new circuits.

The open medical system incorporates task lighting directed at the open space between cores, environmental lighting directed so it bounces off the ceiling, and night lights directed at the floor.

The number of joint lines and crevices between parts, as well as horizontal members, are reduced to facilitate infection control and to minimize the accumulation of dust.

DESCRIPTION OF THE DRAWINGS

These and other features and advantages of the invention are better understood with regard to the following description, claims and drawings, where:

FIG. 3b shows an end view of an alternative embodiment of joined base modules;

FIG. 3c shows a an end view of an alternative embodiment of a side panel;

FIG. 3d shows a detail end view of a joint of a side panel and of a core;

FIG. 4 shows an assembly of upper plate, vertical spacers and core;

FIG. 5 is a section through the top cover and its sloped upper surfaces;

FIG. 5a is a section through an upper plate, a transom and a top cover and its convex upper surface, as taken at section A—A in FIG. 7c;

FIG. 26a shows a top view of a base module of an alternative wall mounted version with the upper plate, transom and top cover removed;

FIG. 26b shows an oblique perspective view of an alternative wall mounting bracket;

FIG. 26c shows an oblique perspective view of a detail of an alternative wall mounting bracket;

FIG. 26f is an oblique upside-down view, showing the underside of an upper plate with the cover removed and the forward portion of the upper plate removed at its transversal centerline, to reveal the transom;

FIG. 26g shows an exploded, top-down perspective view of a wall mounted version;

DESCRIPTION

Figure 1:
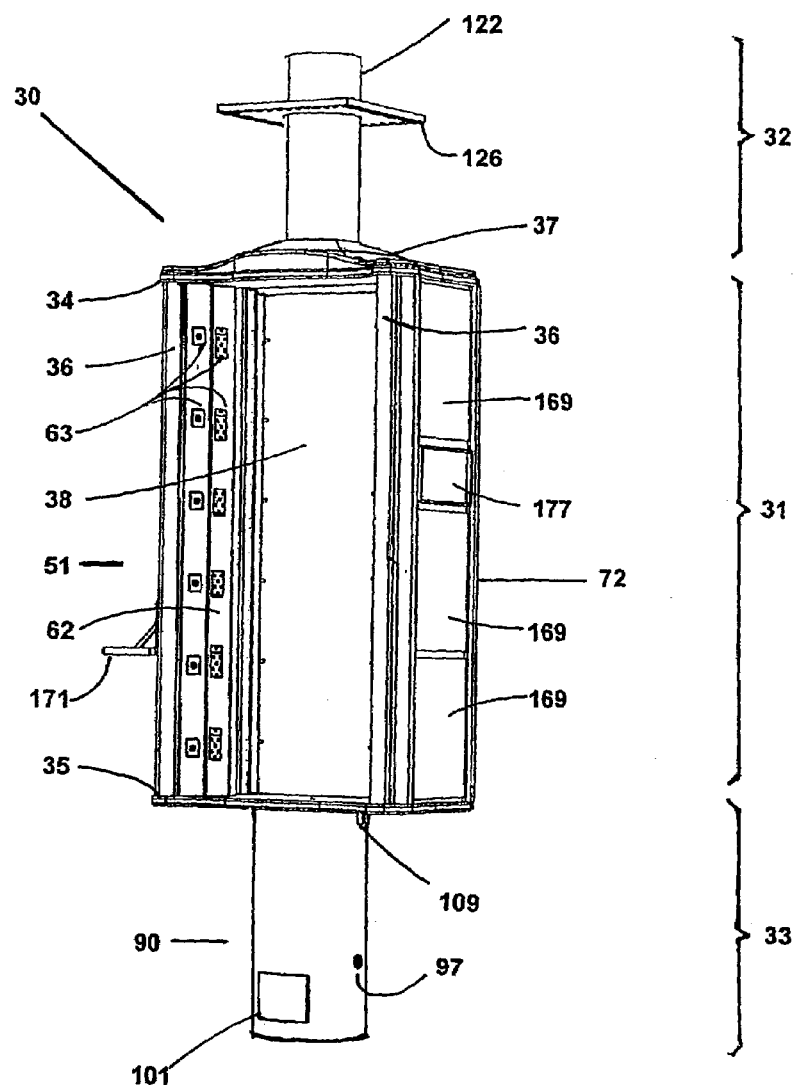
FIG. 1 shows an oblique elevational perspective view of the medical system.
Figures 8, 9:
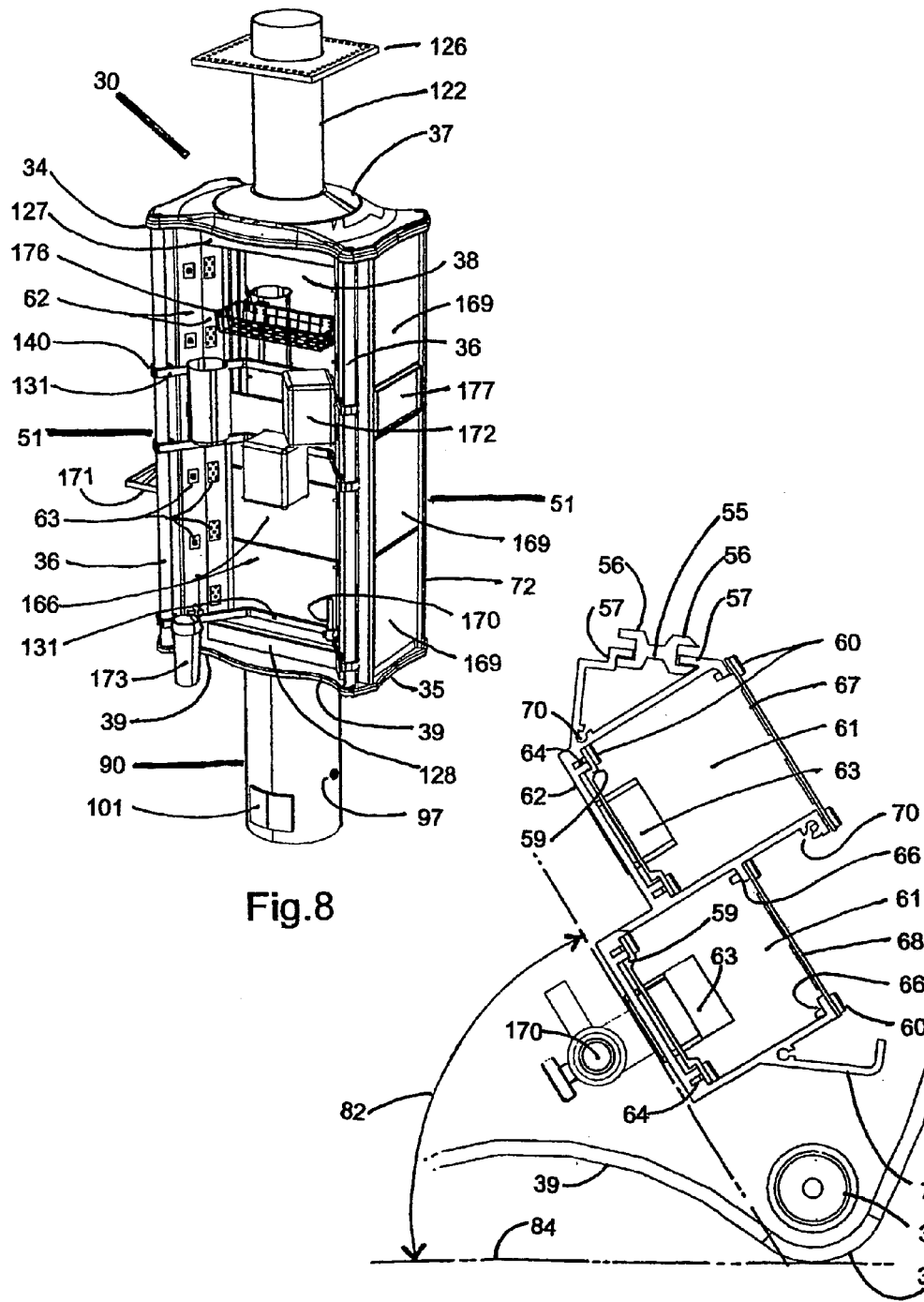
FIG. 8 shows an oblique elevational perspective view of the medical system with alternative utility supply line routing.
FIG. 9 shows a top view of a base module.
Figure 20:
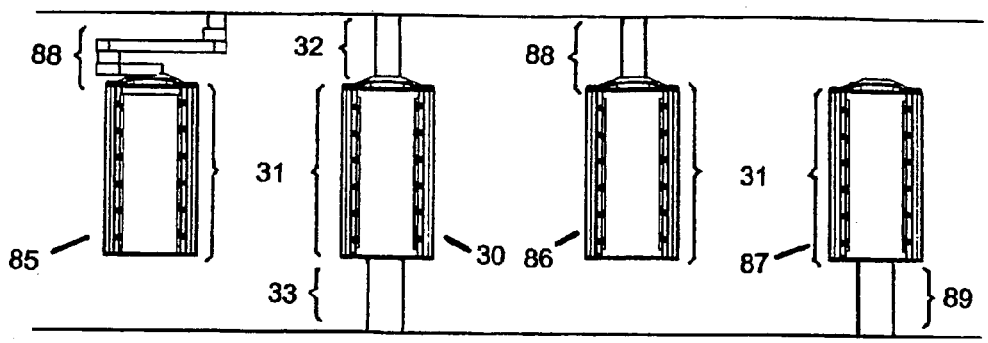
FIG. 20 shows alternative systems supports and utility connections.

As shown in FIGS. 1, 8 and 20, the open medical system 30 includes a main assembly 31, and a utility connection 32, and alternatively, a support 33. The main assembly 31 includes two plates, an upper plate 34 and a lower plate 35, the plates being substantially planar and oriented in a horizontal direction, which is traverse to the main, vertical axis of the system. The two horizontal plates 34, 35 are held in a fixed, spaced apart relation by vertical spacers 36. Also extending between the plates 34 and 35 are two elongated cores 51 of generally trapezoid cross section for containing the utility supply lines and outlets. The cores 51 can be configured in various alternative cross sections, including circular for minimizing the external surface area, rectangular for facilitating low cost fabrication, or elongated to maximize internal volume.

The upper plate 34 and lower plate 35, attached to and held in fixed spaced apart relationship by vertical spacers 36 comprise, in this embodiment, the primary structure of the open medical system. The plate and spacer construction of the primary structure shown is superior to known medical system primary structures for reasons of simplicity, cost effectiveness and efficiency. Other primary structures, however, could be used with less satisfactory results. Such alternative primary structures, like the plate and vertical spacer primary structure, should be strong enough to support the system and user placed equipment, and resist foreseeable forces, including collisions, such as those caused by beds and mobile equipment. The primary structure ordinarily is comprised of vertical members such as vertical spacers 36, and horizontal members, such as plates 34 and 35.

Figure 10:
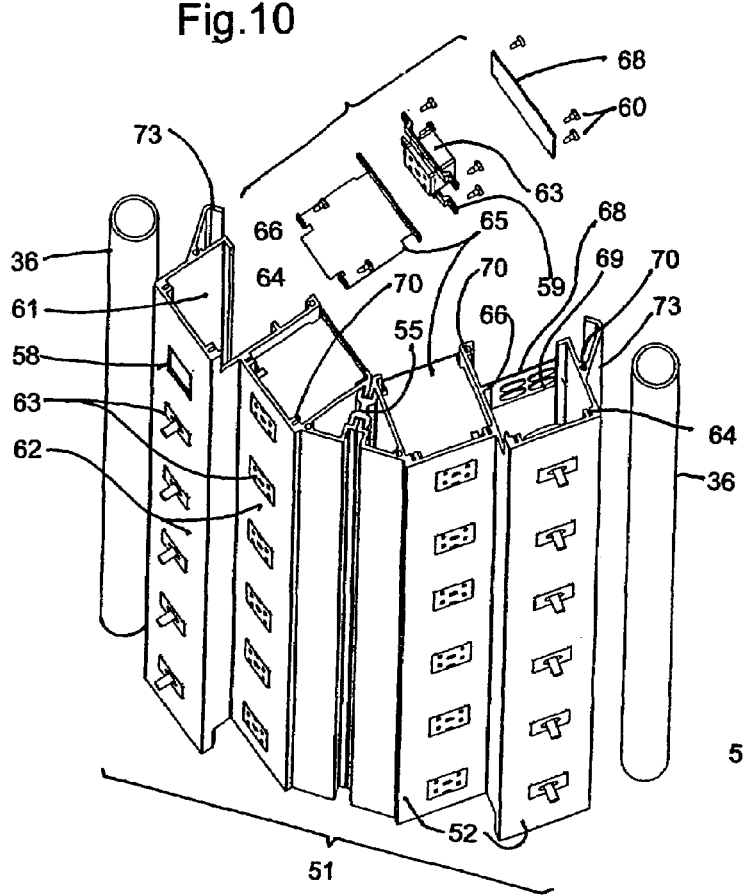
FIG. 10 shows an oblique view of a core showing installation of outlets and barriers.

The main assembly 31 is open and houses the cores 51 between the upper and lower plates 34, 35. As shown in FIGS. 1 and 10, an open space 38 is defined by the upper and lower plates, and the inner surfaces of the outlets 63 that protrude through openings 58 in the outlet surfaces 62 of the cores 51. The cores 51 could pass through the plates 34, 35, but would require a cover such as top cover 37, or other means of preventing exposure of utility lines, such as wires, pipes, hoses, tubes and cables.

The position and spacing of the upper and lower plates 34, 35 ordinarily is determined by ergonomic considerations of reach, such as the limit of upward reach to the upper plate 34 of a $5^{th}$ percentile female user and the limit of comfortable downward reach of a $95^{th}$ percentile male, as determined by anthropometric charts. With control knobs and other elements accessible for manipulation being typically attached near the bottom of equipment, such as monitors, the maximum upward reach required of a user in this alternative ordinarily will be limited to approximately 165.1 cm (65 inches) above the floor to minimize stretching. The maximum downward reach will be limited to approximately 60.96 cm (24 inches) above the floor to minimize bending down by a $95^{th}$ percentile male user. The lower plate 35 is ordinarily raised above the floor by a support such as a base assembly, which may provide clearance for toe space for users, and assure that the wheel bases of equipment typically found in the patient care environment, such as stands for intravenous fluids and pumps, clear the base assembly. In this embodiment, the base assembly is approximately 20.32 cm (8 inches) in diameter.

In the preferred embodiment, the lower plate is approximately 40.64 cm (16 inches) above the floor, and the upper plate is approximately 177.8 cm (70 inches) above the floor, resulting in an open space of approximately 137.16 cm (54 inches) in vertical dimension. Lower plates as low as 30.48 cm (12 inches) and as high as 91.44 cm (36 inches) from the floor, and upper plates as low as 121.91 (48 inches) and as high as 243.84 (96 inches) off the floor, will work, but ordinarily will result in degradation of ergonomic, economic and aesthetic utility. Special needs may make open spaces of different sizes preferable.

The core-to-core spacing between the inner surfaces of cores 51 is also driven by anthropometric factors and may be generally sized between 40.64 and 60.96 cm (16 and 24 inches), corresponding to the spacing between a user's shoulder joints and his or her ability to easily reach between cores 51 with both arms and hands to manipulate equipment while facing the open medical system. The anthropometric criteria can be varied depending on the population characteristics of the regions of the world where the open medical system 30 may be used. Another factor considered in determining appropriate spacing between cores is the need for an unobstructed view across the open medical system 30 to facilitate face-to-face communications between medical staff at opposite sides of the open medical system 30, and the need to station patient monitors, computer displays and other equipment within the perimeter of the open medical system without these elements impinging unduly on the circulation space outside of the system's footprint. Another consideration for the horizontal spacing of the cores 51 is to allow typically-used patient care equipment, such as intravenous pumps, oxygen blenders, suction containers, and supplies, such as storage baskets and sharps containers, to be comfortably positioned within the open space of the system without projecting appreciably outside of the system's footprint. The approximate numbers for determination of the position and spacing of the plates 34, 35 and core-to-core spacing obviously can vary depending on the user population and the nature of the equipment to be used.

In the preferred embodiment of the open medical system 30, the cores are spaced apart to create an open space with 45.72 cm (18 inches) of clearance between cores. Core spacing with cores as close together as 30.48 cm (12 inches), and cores spaced apart by as much as 91.44 cm (36 inches), are possible but will result in degradation of ergonomic, economic and aesthetic utility.

Figure 1A:
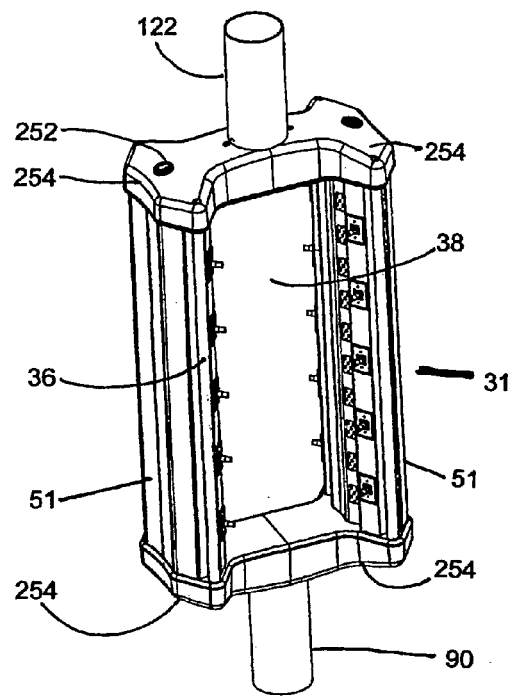
FIG. 1a shows a frontal elevational perspective view of a preferred embodiment of the medical system.
Figure 26D:
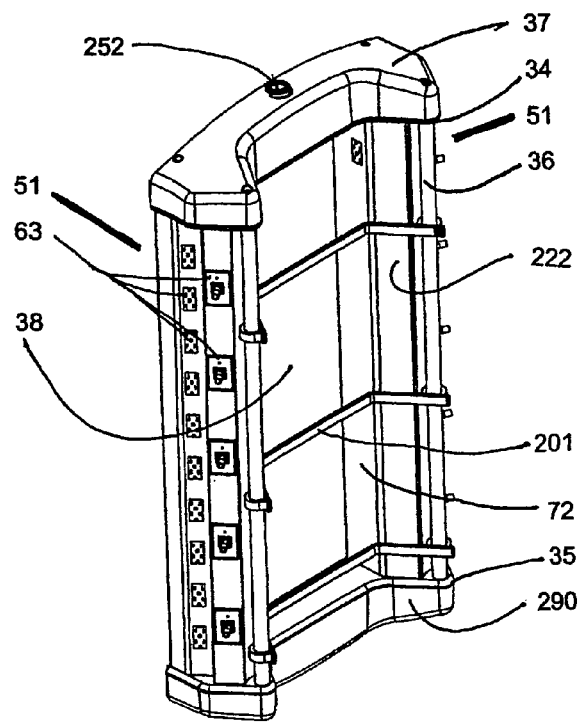
FIG. 26d shows an oblique perspective view of an alternative a wall mounted version.

The range of reach for the $5^{th}$ to $95^{th}$ percentile user also determines how far into the system a user of the open medical system can practically reach and, in this embodiment, the depth of reach is from 17.78 to 35.56 cm (7 to 14 inches). The depth of one side of the open medical system, as measured from the frontal plane 84 at one side to the front-to-back axis 76, ordinarily would be in this range, which is the depth of the wall mounted version 148 as shown in FIG. 26d. The free-standing open medical system as shown in FIG. 1a, having user access from opposite sides, may be sized twice the depth of the wall mounted version 148, or with a spacing of 35.56 to 71.12 cm (14 to 28 inches) between the front-to-back axis 76 and the frontal planes 84 on each side of the open medical system.

The depth of the open medical system 30 ordinarily is calculated as the distance between the two vertical spacers on the same side of the side-to-side axis 77, which two vertical spacers are farthest from, and on opposite sides of, the front-to-back axis 76, the distance being measured along a line parallel to the side-to-side axis 77. If the plates or covers extend a greater distance from the front-to-back axis 76 than the spacers, depth generally is measured from the portion of the plate or core farthest from the front-to-back axis 76, as measured in a line parallel to the side-to-side axis 77. The front-to-back distance between vertical spacers 35 is selected generally by ergonomic factors based on anthropometric charts of reach for $5^{th}$ to $95^{th}$ percentile users, and also by practical considerations relating to the sizes of support equipment such as infusion pumps and patient monitors, as well as various storage items, typically used at a patient's bedside. In the preferred embodiment of the open medical system 30 the front-to-back distance between vertical spacers is approximately 48.26 cm (19 inches), but front-to-back spacer distances as short as 30.48 cm (12 inches) and as long as 76.2 cm (30 inches) are possible, but ordinarily will result in degradation of ergonomic, economic and aesthetic utility. Another consideration for determining front-to-back distance is to permit the open medical system, 30 to be split on a vertical plane along its front-to-back axis 77 to be configured as a wall mounted version that has adequate depth for storage and does not project so far from a wall as to interfere with the use of a typical patient room.

The open medical system 30 is available to users with an open space 38, meaning an area without any structures not placed by a user that traverse, divide, or otherwise obstruct the open space 38. Minor obstructions such as an elongated gas outlet may project into what would be the open space described by the above ergonomic measurements of reach. The user is able to arrange and configure a system to optimize his or her specific work flow and task setup, and may decide to leave the open space 38 entirely unobstructed, or to attach any elements such as contoured equipment rails holding accessories such as baskets 176, partition modules 122, or any other devices in the open space 38. Users may move or remove any of these elements whenever desired. An open space 38 that may be traversed, divided by, or otherwise obstructed with temporary, moveable structures by the user is within the scope of this invention.

Figure 3:
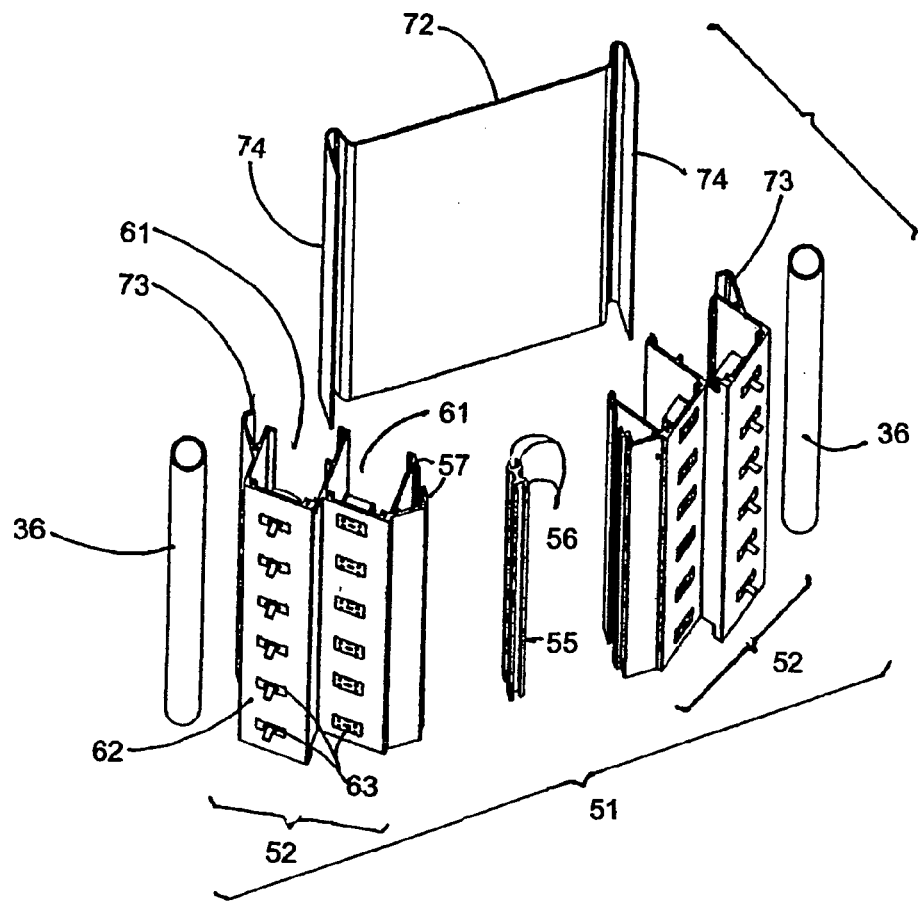
FIG. 3 shows an exploded view of a core with associated vertical spacers and side panel.
Figure 3A:
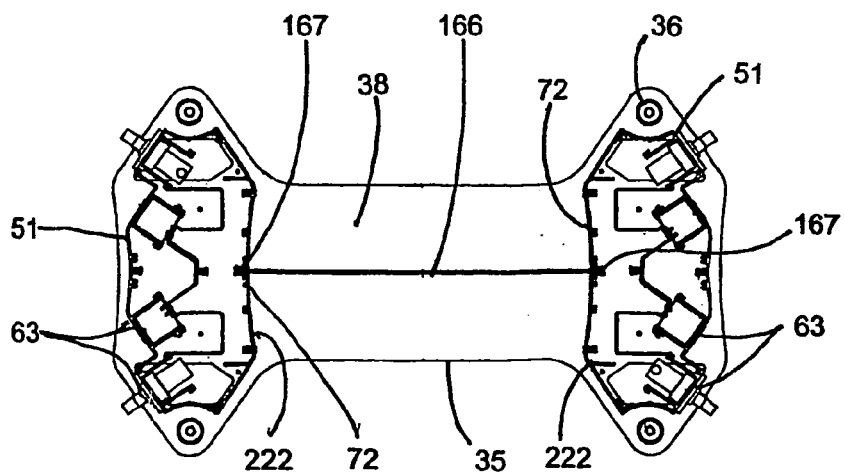
FIG. 3a shows a top view of an alternative system with outward-facing cores with cover, upper plate and transom removed.

In an alternative embodiment shown FIGS. 3a and 26d, cores 51 can be positioned so that the outlets 63 are facing away from the open space 38. In this alternative, the open space 38 is bounded by the upper and lower plates and the external surfaces 222 of the side panels 72. In alternatives where only one of the two cores 51 has outlets 63 facing away from the open space 38, the open space 38 is defined by the upper and lower plates 34, 35, the outlet surfaces 62 of the core 51 with outlets facing the open space, and the external surface 222 of the side panel 72 of the core 51 with outlets facing away from the open space.

Figure 1C:
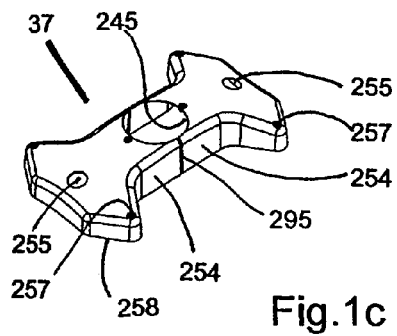
FIG. 1c shows an oblique perspective of an alternative cover using transversally divided cover modules.
Figure 1D:
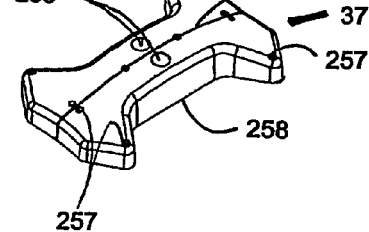
FIG. 1d shows an oblique perspective of an alternative cover using longitudinally divided cover modules.
Figure 1B:
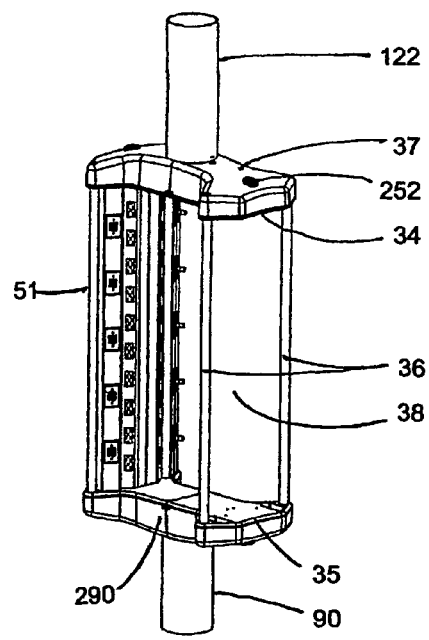
FIG. 1b shows an oblique elevational perspective view of an alternative embodiment of the medical system using one core.

Alternatively, as shown in FIG. 1b, the open medical system 30 may be configured with a single core 51 in order to provide more unobstructed open space within the system's footprint for uses such as deploying patient care accessories and equipment.

Figure 2:
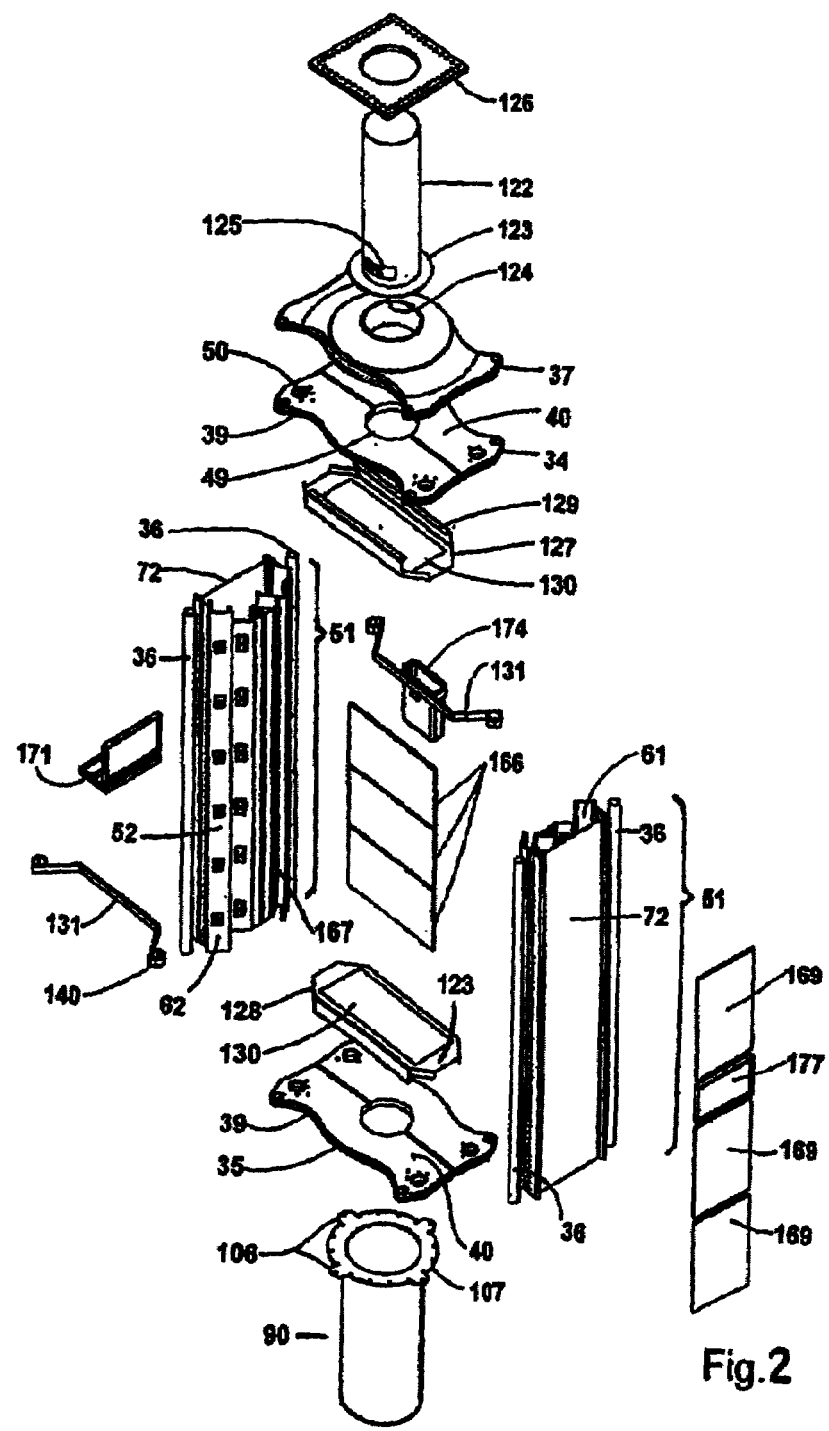
FIG. 2 shows an exploded view of the medical system.

In alternatives with transoms 127, 128, as shown in FIG. 2, the transom surfaces 123 which have, or would have, covered access openings 130, rather than the upper plate and lower plate, define the upper and lower boundaries of the open space. The transom surface 123 defining the upper and lower boundary, as mentioned, ordinarily is the transom surface 123 on which the covered access opening 130 is, or would be located, and generally is the transom surface 123 farthest from, and generally parallel to, the horizontal surface of the plate closest to the transom. For example, in FIG. 7c, the upper transom 127 is closest to upper plate 34, and the transom surface 123 has a covered access opening 130 of the transom 127, and is the surface farthest from the plate closest to the transom, the upper plate 34.

The open medical system 30 has a utility connection 32 for connecting utilities to the main assembly. As shown in FIGS. 1, 8 and 20, alternative embodiments may include a support 33, such as a base assembly 90. The system could be supported by means provided by others, such as directly on a floor pedestal or other structure, as shown in FIG. 20.

In this embodiment, plates 34, 35 are milled from aluminum, 2.54 cm (one inch) thick, and are approximately 45.75 cm by 81.28 cm (32 by 18 inches) in size, though different sizes could be used. The plates could be manufactured of any planar sheet material, including steel, stainless steel, wood and plastics, as well as machined, cast or molded, provided that the plates are strong enough to support the weight of equipment and utilities attached to the system, are rigid enough to prevent racking and excess deflection of the system, are easy to sanitize, and are fire resistant.

Figure 7:
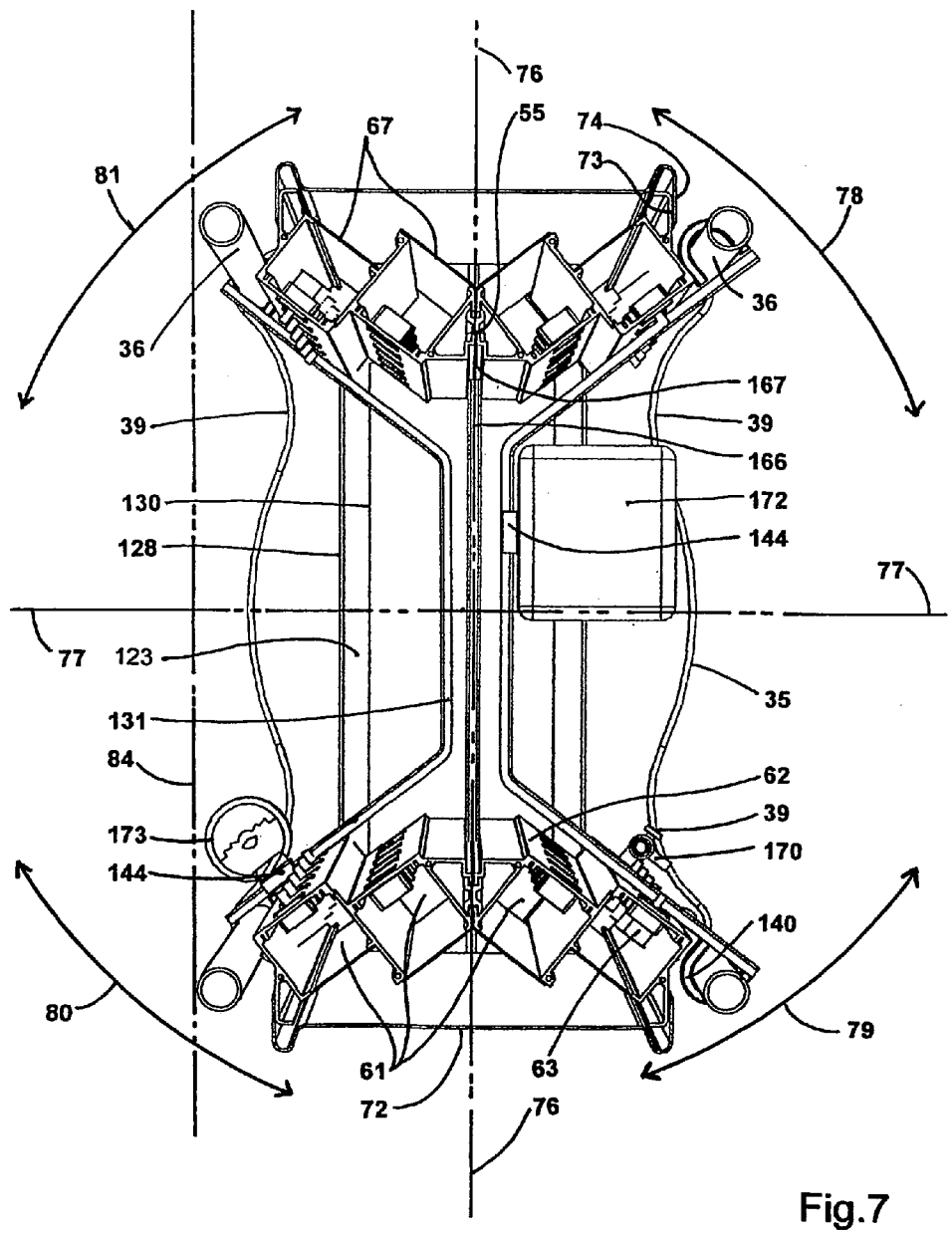
FIG. 7 shows a top-down perspective view into the system with ceiling tube, top panel, top cover and upper transom removed.

As shown in FIGS. 4 and 7, the upper and lower plates 34, 35 have two long edges 41 and two short edges 42. Where a long edge 41 adjoins a short edge 42, the long edge 41 has an indentation 39 that allows equipment, such as suction containers 173 that are attached to contoured equipment rails 131, to extend downward below the lower plate 35 and be protected within the footprint of the system 30.

The vertical spacers 36 in this embodiment are 3.81 cm (1.5 inch) diameter stainless steel tubes with sturdy walls, but could be of aluminum or other materials, and of different diameter, and different cross-sectional shapes.

As shown in FIG. 4 by a cutaway section of the upper plate 34, the vertical spacers 36 permit connection of the plates 34, 35 in this embodiment by means of threaded rods 44 extending through the spacers' interior lumen and tightening external nuts 45 onto lock washers 46 and against the upper and lower plates 34, 35 to create a stable, tensioned structure. Counter bores 43 recess the mounting nut and washer to be flush with the outer surfaces 40 of the plates 34, 35.

Optionally, to eliminate the cost of machining counter bores 43, mounting nuts 45 and lock washers 46 can be tightened directly against the outer surfaces 40 of the plates 34, 35 and concealed by top cover 37 that may be attached to the upper plate 34, and bottom cover 290 that may be attached to the lower plate 35, or both.

Numerous methods of attachment of the vertical spacers 36 and plates 34, 35 could be used, including threaded bolts that compress the plates against the vertical spacers by engaging the threaded interior lumen of the vertical spacers, threading the vertical spacers directly into tapped holes on the plates, or welding the vertical spacers to the horizontal plates.

The open medical system alternative shown in FIGS. 1, 2 and 8 comprises two cores 51, each one located between a pair of vertical spacers 36. Each of the two trapezoidal cores 51 is made by joining two identical base modules 52, as shown in FIGS. 3, 7 and 10. The vertical orientation of outlet surfaces 62, and their disposition in four distinct vertical groupings corresponding to the four base modules 52, provides a clear separation and delineation of equipment and utility outlets in four distinct, recognizable and memorable zones. It ordinarily is cost effective to use substantially identical base modules to make a core, but non-identical base modules and asymmetric modules would work, and may be preferable for specialized settings, such as where one side or core of the system is dedicated to a particular utility, which could make modules of differing sizes more efficient. These zones are depicted in FIG. 7, in which the open medical system's two vertical axes of symmetry, front-to-back axis 76 and side-to-side axis 77, are shown. These zones help users of the system clearly designate each of the base modules 52 as pertaining to a side of the system, and to the front or back of the system. The four zones are indicated in FIG. 7 by arcs 78, 79, 80 and 81, and present four distinct groupings or banks of outlets. The four zones apply to alternatives where the outlets 63 of one core 51, or the outlets 63 of both cores 51, as in FIG. 3a, are facing away from the open center 38, as well as in alternatives where the outlets 63 of the cores face toward the open space 38.

Figure 6:
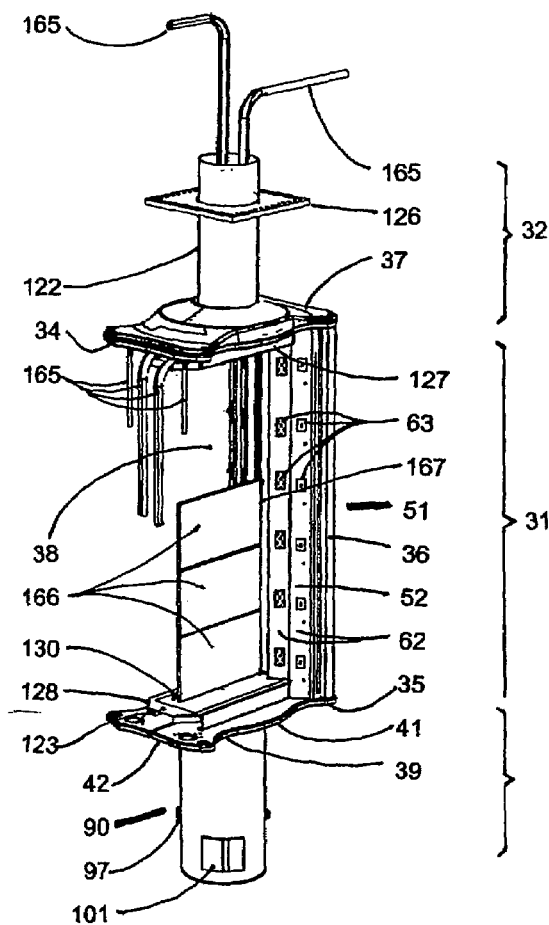
FIG. 6 shows an oblique side view facing a core with opposite core and vertical spacers removed.

When open medical systems are used in specialized care areas such as in neonatal intensive care units, it may be desirable to insert one or several partition modules 166 into central partition grooves 167 located in each core 51, as shown in FIG. 6. These partition modules help block the view between incubators, give mothers more privacy with their babies, and help isolate personal belongings, such as milk bottles, on one side of the system.

Alternatively, in configurations where the external surface 222 of the side panel 72 of one core 51, or the external surfaces 222 of the side panels 72 of both cores 51 shown in FIG. 3a, face toward the open space 38, optional partition modules 166 may be inserted into central partition grooves 167 located on the external surfaces 222 of side panel 72 of each core 51. A partition module 166 may be sized to fill the open space with a single partition module 166, extending from the upper surface of the lower plate 35 to the underside of the upper plate 34.

As shown in FIG. 9, each base module 52 in this embodiment is made from extruded aluminum and is comprised of separate wiring channels 61 in which utility service lines 165 are contained and concealed, and corresponding outlet surfaces 62 through which the corresponding outlets 63 project. Two base modules 52 are joined together into symmetrical cores 51 by fasteners, such as a locking extrusion 55. Base modules 52 may also be made using extruded plastics, cast metal, fabrications using sheet steel or plastic, fiber-reinforced resins, or other known materials and manufacturing processes.

In this embodiment, the clamping flanges 56 of the locking extrusion 55 interdigitate with the locking flanges 57 on the base modules 52 to assure accurate alignment and provide clamping force. In this embodiment, there are two base modules 52 with a total of four wiring channels 61 in a core, though the number could vary. For example, alternative configurations that use only one wiring channel 61 per base module 52, use more wiring channels 61 per base module 52, or incorporate monolithic cores with several integral wiring channels, are within the scope of this invention. The wiring channels 61 are configured to present the utility outlets conveniently to a user at angles to the side-to-side axis 77.

In an alternative embodiment, two base modules are joined together into substantially symmetrical cores 51 using connecting means 205, as shown in FIG. 3b that may include fasteners such as locking extrusions 55. Connecting means 205 also may include, as shown in FIGS. 3b, 3c and 3d, a plurality of clips 208 preferably made of hardened steel, cooperating with locking flanges 57 that have a semicircular groove 207, and an optional alignment rod 206 inserted between the semicircular grooves 207. Connecting means 205 may also include screws, adhesives, double sided adhesive tape, connecting brackets or common connecting devices.

The cores 51 are closed off with side panels 72, as shown in FIGS. 2, 3 and 7, that are typically made of aluminum, stainless steel, sheet steel, plastic sheet, fiberglass or laminate construction. Each side panel 72 is attached to a core 51, such as by mechanical fasteners, to enclose and protect the utility lines. As shown in FIGS. 1, 2 and 8, side panels 72 also may accommodate accessories, such as a nurse call module 177, accessory panels 169 such as bulletin boards, tack boards and white boards, a fold-out writing shelf 171, or storage devices such as patient chart holders, hangers for catheters, organizers for notes, reference documents, papers and similar items used by medical personnel or patients' families.

Figure 13:
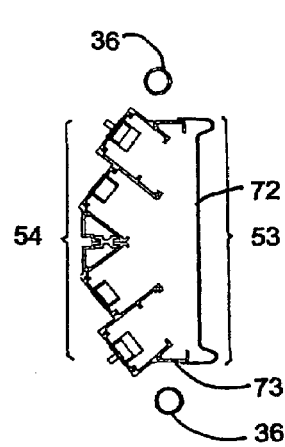
FIG. 13 shows a top view of a core assembly with fixed side panel.
Figure 14:
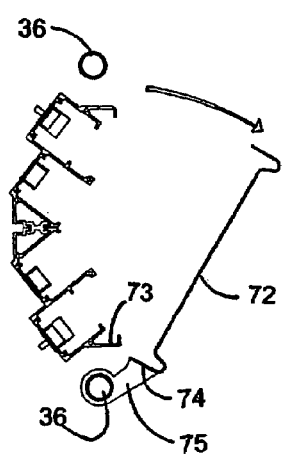
FIG. 14 shows a top view of a core assembly with hinged side panel.

As shown in FIG. 13, a side panel 72 may be attached to the closure flanges 73 of a fully assembled core. Optionally, as shown in FIG. 14, a side panel 72 also can be hinged using two hinge brackets 75 attached to the side flange 74 near the top and bottom of a side panel 72 to permit panel 72 to swing open like a door for easy access for servicing, repairs, or installation of additional outlets.

In the alternative embodiment shown in FIG. 3c, the side panel 72 is assembled from two similar, longitudinal modules 209 and 210 that may be made from extruded aluminum or plastic, or fabricated from metal or plastics, and are joined together by connecting means 205, such as locking flanges 57, cooperating with fasteners such as clips 208, locking extrusions 55, other fasteners, or alternatively by adhesives or bonding. In this embodiment, an optional partition groove 167 is formed by the juncture of notches 211 of the locking flanges 57 of longitudinal modules 209, 210. The partition groove 167 can accept partition modules 166 in alternatives where the external surfaces 222 of one or both side panels 72 face the interior open space 38.

Longitudinal modules 209 and 210 in this embodiment are substantially the same, except that, as shown in FIG. 3c, the side flanges 74 of the longitudinal modules 209, 210 are configured as a yoke 214 with an inner leg 215 and an outer leg 216. On longitudinal module 210, the inner leg 215 of the yoke 214 on side flange 74 has been trimmed, by machining or any suitable process, from the yoke 214 of longitudinal module 209 to obtain module 210. Alternatively, the inner leg 215 of the yoke 214 on side flange 74 may be suppressed using a die insert in the extrusion die for module 209 to extrude the longitudinal module 210 inner leg 215 of the yoke 214 on side flange 74. Assembling side panel 71 from longitudinal modules 209 and 210 saves cost by reducing the size of the extrusion die required to form the longitudinal modules 209, 210.

Additionally, when creating alternative configurations such as wall mounted version 148, the side panel 72 may be a single, longitudinal module 209, used in cooperation with a base module 52, and a back panel 280 to form each core. Alternatively, a side panel 72 may be formed from a single module, or by using 3 or more modules.

Figure 7A:
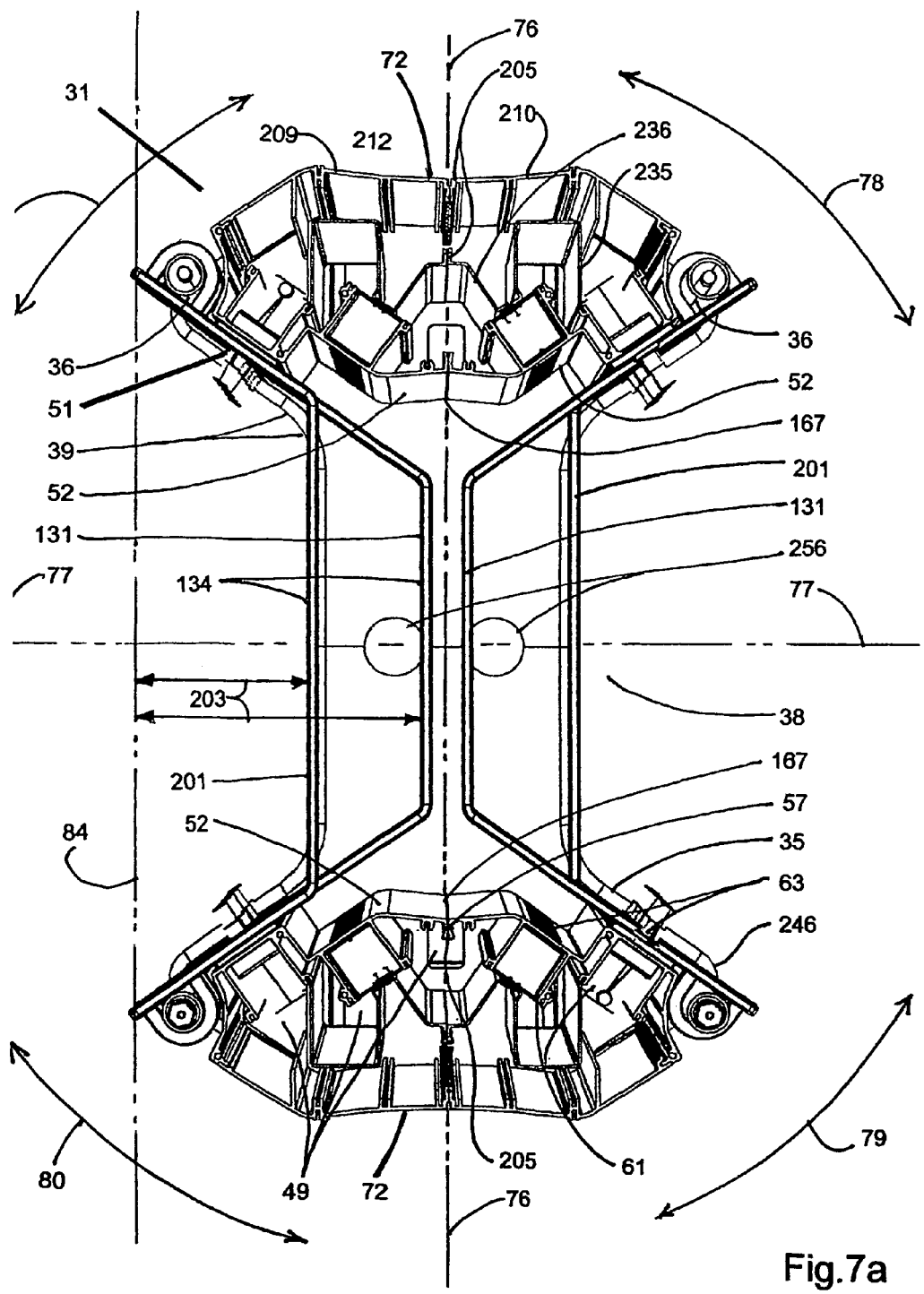
FIG. 7a shows a top-down perspective view into an alternative system with ceiling tube, top panel, top cover and upper transom removed.
Figure 7B:
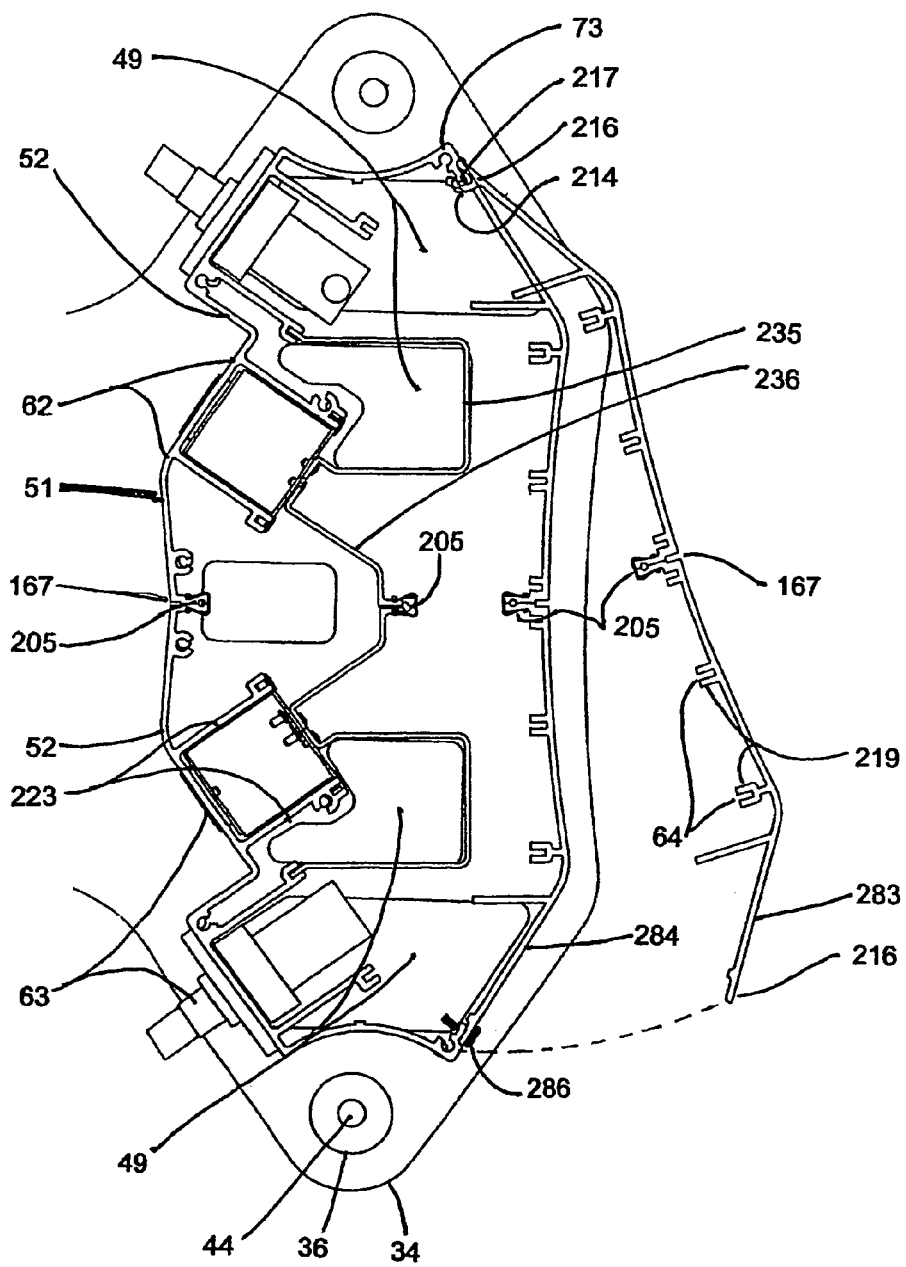
FIG. 7b shows a top-down plan view of a core with the cover, transom and upper plate removed, and with an alternative side panel.

The yoke 214 of the longitudinal module 209 of side panel 72 shown in FIG. 3c, is configured with an inner leg 215 and an outer leg 216, and yoke 214 permits panel 72 to pivot around pivot flange 217 of the side flange 74 of a base module 52 as shown in FIG. 7b. The longitudinal module 210 of side panel 72 is configured with a truncated inner leg 215 and an outer leg 216 that serves as a stop against the pivot flange 217 of the closure flange 73 of the base module 52 and will accept attachment means such as screws 286, or other types of latches or fasteners, to help secure the side panel 72 to the core 51 while permitting quick access for repair and service.

As also shown in FIG. 3c, one or more ribs 219 may be provided on the inner surface 218 or external surface 222 of the longitudinal modules 209, 210, or on both surfaces 218, 222. Ribs 219 serve as mounting supports for attaching accessories, such as a nurse call module 177 or outlets 63, that may protrude through optional cutouts 58 that may be added to the longitudinal modules 209, 210 of side panel 72. Other optional equipment such as transformers, voltage monitors and similar hospital electrical system equipment may also be attached to the ribs 219. The ribs 219 may also serve as structural reinforcements of longitudinal modules 209, 210.

Optionally, the ends of the ribs 219 on the inside surfaces 218 and external surfaces 222 of longitudinal modules 209, 210 can form threaded grooves 64. Together, the ends of the ribs 219 form a mounting surface 221, indicated by a dashed line in FIG. 3c, onto which the above-mentioned accessories and optional reinforcement plates may be directly assembled using the tapped grooves 64 at the ends of ribs 219 without drilling or tapping.

As shown in FIG. 13, each core 51 has an outward face 53 defined by a side panel 72 and an inner surface 54, and the faces of outlets 63 which protrude through openings 58 cut into the outlet surfaces 62 of the cores 51, and inner surfaces 54 face each other across the open space 38 of the open medical system 30.

Alternatively, as shown in FIGS. 3a and 26d, special medical facility layouts may require one or both of the cores 51 to be positioned with outlets 63 of the base modules 52 facing outward so that outlets 63 protruding through the faces of the base modules 52 are directed away from the open space 38, and that the external surfaces 222 of one or both of the side panels 72 face toward the open space 38. This flexibility helps accommodate diverse user needs and reduces the likelihood of premature obsolescence arising from evolving procedures and working methods, and demographic changes.

Modular elements enabling such versatility, flexibility and adaptability include base modules 52, longitudinal modules 209,210, outlet holders 59, back plates 68, cover modules 254, vertical spacers 36, contoured equipment rails 131 and 201, and other such modular components of the open medical system 30. These modular elements could be used in medical systems without an open space.

The wiring channels 61 serve as distinct raceways that can be dedicated to a single utility category such as medical gases, emergency power or regular power without the need of additional separation of different types of utilities. As shown in FIG. 10, outlets 63 are installed into the wiring channels 61 from the inside into pre-punched openings 58 cut into the outlet surfaces 62 of each wiring channel 61 and attached such as by outlet holders 59 that are retained by fasteners such as mounting screws 60 inserted into threaded grooves 64 that extend inward from each wiring channel 61. If codes or ordinances require separation of adjacent outlets 63, a divider 65 can be installed by fastening it to the threaded grooves 64 and into the mounting flanges 66 as shown in FIGS. 9 and 10. The rear opening of each wiring channel 61 can be closed off by a full-length back plate 67 that is screwed to the mounting flanges 66 of each wiring channel 61. In cases where one or more outlets must be separated, smaller back plate modules 68 can be used. The back plates 67 and 68, as well as the dividers 65, have knock-out openings 69 to allow for traditional wiring options.

Figure 5B:
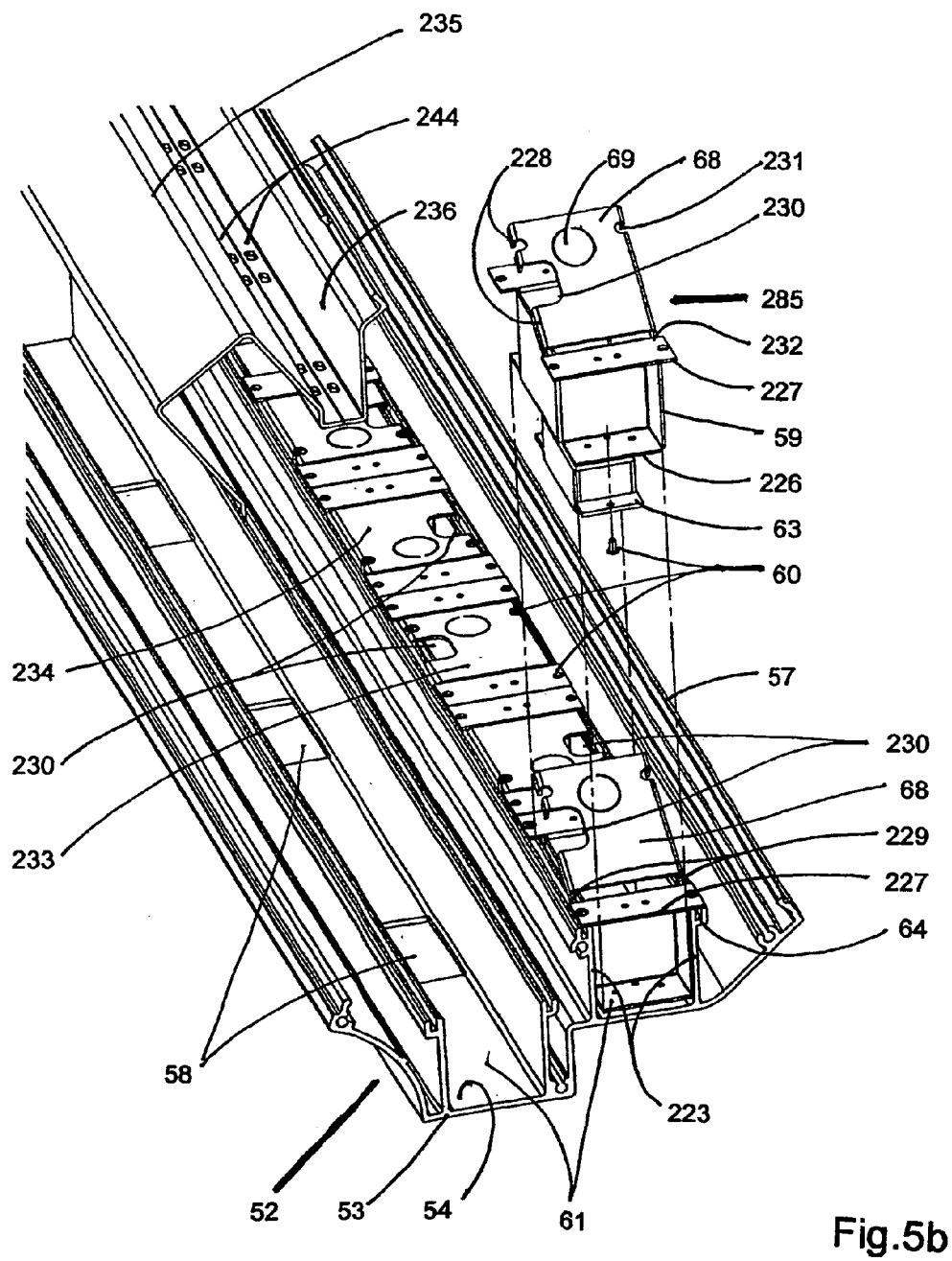
FIG. 5b shows an oblique perspective view of outlets and wire chases installed in a base module.

FIGS. 5b, 7a and 7b, show an alternative embodiment in which each wire channel 61 of a base module 52 has two side walls 223. In order to support structures, such as outlet holders 59, wire compartment back plates 67 and 68, dividers 65, and wire chases 235, 236, each sidewall 223 ends in a threaded groove 64. Together, the ends of the wire channels 61 containing threaded grooves 64 form a mounting surface 221 as indicated by a dashed line in FIG. 3b. Outlet holders 59 and back plates 68 may be assembled to the mounting surface 221 without drilling or tapping using fasteners such as screws 60. Preferably, the groove 64 is formed so that the inner surface 224 of the wire channel 61 is straight-walled without projections.

Figure 6B:
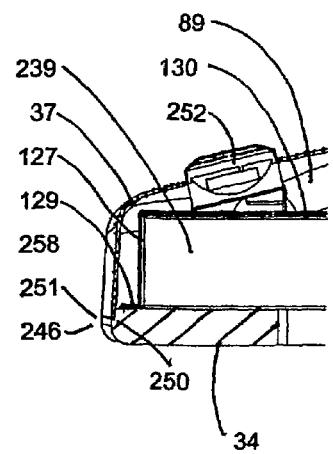
FIG. 6b shows a detail sectional view through an upper plate, a transom and a top cover and its convex upper surface, also taken at section A—A in FIG. 7c.
Figure 6A:
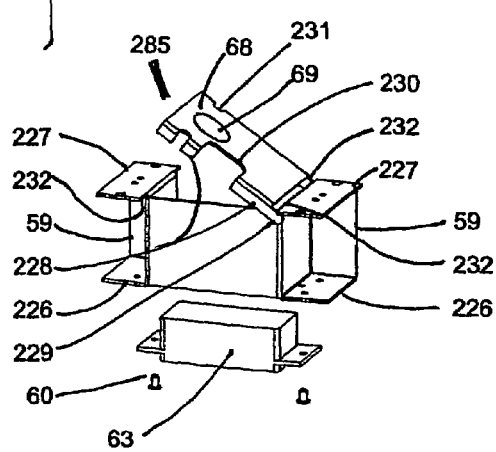
FIG. 6a shows an oblique exploded view of an outlet module.

Each outlet 63 may be pre-assembled to an outlet holder 59, as shown in FIG. 6a, that is sized to fit between the two side walls 223 of each wire channel 61, as shown in FIG. 5b. During factory assembly, the outlet holder 59, an outlet 63, and associated wires 204, hoses 249, or other utility conduits, may be inserted between the side walls 223 and into the wire channel 61 from the inside, so that the face of the outlet 63 protrudes through the pre-punched opening 58 in the outlet surface 62 of each wire channel 61. This enhances manufacturing efficiency by allowing stocking of pre-assembled outlet modules 285 in preparation of final assembly and integration of core 51. Preassembled outlet modules 285 also facilitate repair, replacement, and upgrading of outlets in a open medical system 30.

As shown in FIGS. 5b and 6a, the mounting flanges 227 of each outlet holder 59 extend laterally across the mounting surface 221 at the ends of the side walls 223 of base modules 52 to enable each outlet holder 59 to be secured with fasteners such as screws 60 or other types of fasteners to the mounting surface 221 that defines the depth of the wire channel 61. In this embodiment, outlet holders 59 and back plates 68, as well as the wire chases 236 and 236 described in detail below, can be assembled efficiently and safely because all fasteners are applied from the same side without the need to rotate, flip over or move the core 51 during assembly in the factory without risking repetitive stress.

Further, the outlet holder 59, in conjunction with the inside surfaces 224 of the side walls 223 of a wire channel 61 and a back plate 68, defines an enclosed and electrically safe wire compartment that isolates the terminations of each outlet 63 and segregates them from adjoining outlets 63. This enables outlets for a variety of types of power, such as emergency power, normal power, or low voltage signals, as well as outlets for gases and other devices, including blank panels, to be installed side by side wherever a user might want to specify them, while maintaining a minimal separation typically required by building codes and regulatory agencies.

Lower cost is achieved by standardizing the sizes, number, and location of openings 58, pre-punching in cores 51 at standard, fixed spacing that will enable the maximum number of outlets to be installed in a wiring channel 61 with, a safe minimum distance between outlets 63. When assembling outlets 63 in the factory for a specific work order installation, the maximum number of outlets is not always required, and all openings 58 may not be needed for outlets. In these cases, commercially available blank filler panels may be substituted for any outlet to fill the openings 58.

The back plate 68 may, as shown if FIGS. 5*b* and 6*a*, include side flanges 228, hinge tabs 229, wire opening 230, mounting screw slots 231, and one or several conduit knockouts 69. Alternatively, back plates 68 with no openings or knock-outs, back plates 68 with multiple wire openings along either or both side flanges 228, and back plates 68 where all openings, including wire opening 230, are perforated knock-outs, may be used depending on the specific requirements of a particular user or installation. An outlet holder 59 also may hold a non-functioning blank instead of a functioning outlet 63 in order to close the opening 58 cut into the outlet surface 62 of a wire channel 61.

To gain access into any wire compartment 239 by way of the central knock-out 69 in back plate 68, the mounting flanges 244 of the wire chases 235, 236 that overlay the back plate 68 may be notched or, optionally, have appropriate knock-outs as is accepted practice in wire device enclosures. Preferably, at least one knock-out opening 69 is centered between the side flanges 228 of the back plate 68 so that auxiliary wires, tubes or hoses can be brought from individual compartments of any outlet module 285 without being routed trough the wire chases 235 or 236.

As shown in FIGS. 5*b* and 6*a*, the distance between the side flanges 228 of back plate 68 corresponds to the spacing of grooves 64 at the ends of the side walls 223, so that flanges 228 will engage the grooves 64. During assembly, the hinge tabs 229 of the back plate 68 are inserted into the grooves 64 of the side walls 223 and pushed under the leading edges 232 of a mounting flange 227 of an outlet holder 59. The back plate 68 is then placed into contact with the mounting surface 221 and attached, such as by inserting one or preferably two screws 60 through the screw slots 231 and into grooves 64.

In the embodiment of the back plate 68 shown in FIG. 5*b* and 6*a*, a wire opening 230 is provided along only one side flange 228, so that installing the back plate 68 in a first orientation 233 will locate the wire opening 230 near one side wall 223, and installing the back plate 68 in a second orientation 234 will locate the wire opening 230 near the other side wall 223. The reversibility of the back plates 68 enables separation of the wires connected to each outlet 63, and the grouping of these wires into distinct wire raceways as further described below.

In options where wire separation is required, an alternative embodiment uses commercially available conduit or wire mold channels as wire raceways to achieve further separation of the wiring running between outlets 63 and the areas where hospital connections are made, such as in the transoms 127, 128 or in commercially available or customized wiring boxes that may be located on the outer surfaces 40 of plates 34, 35, or elsewhere in the open medical system 30. Wiring also can be separated with commercially available or custom fabricated conduit channels that are connected through optional knockouts in the side walls 223 of the wire channels 61, in the back plates 68, or in both.

In an embodiment shown in FIGS. 5*b*, 7*a* and 7*b*, the wire chases 235, 236 are formed channels made from extruded aluminum but could also be made from sheet metal or other suitable material with fire retardant properties. The peripheral wire chase 235 may collect and segregate internal wires 204 protruding from the aligned wire openings 230 of back plates 68 installed in a first orientation 233, and guide them to feed holes 49 in the upper plate 34 and, optionally, in the lower plate 35. The central wire chase 236 may collect and segregate wires protruding from the aligned wire openings 230 of back plates 68, installed in a reversed, second orientation 234, and guides them to feed holes 49 in the upper plate 34 and, optionally, in the lower plate 35. In options where wire separation is required, wire chases 235, 236 can be formed in many alternative shapes and cross sections that serve the purpose of wire separation. In the preferred embodiment shown in FIGS. 7*a*, 7*b* and 26*a*, the wire chases 235, 236 use cross sections that facilitate fabrication and provide alignment with, and transition to, wire compartments 239 optionally incorporated in the transoms 127, 128. Alternatively, a one-piece central wire chase 236 of any shape, as well as feed holes 49 through plates 34, 35 of any size and shape that do not extend outside of the contact area between cores 51 and plates 34, 35 are also within the scope of this invention.

The central wire chase 236 is configured from two identical wire chase modules 237 joined together by connecting means 205, as shown in FIG. 7*b*. Optionally, a chase module 232 may be used singly such as in the wall mounted option 148 where a vertical back plate 280 of the wall mounting bracket 150 cooperates with a chase module 237 and a base module 52 to create a safe wire enclosure. This invention also encompasses variations of wire chases 235, 236 and 237 using full-length wire chases composed of shorter sections or individual modules.

As shown in FIG. 4 the cores 51 are attached to the open medical system 30, such as by fasteners, such as self-tapping screws 47 inserted through recessed holes 48 in the outer surfaces 40 of the upper and lower plates, into screw receptacle grooves 70 that are extruded into the base modules 52. Optionally, a gasket 71 can be installed between plates 34, 35 and cores 51 to prevent unsanitary gaps and make the unit easier to clean.

The two opposing cores 51 contain, conceal and shield all utility service lines, such as cables, hoses, wiring, wiring devices and outlets. As shown in FIGS. 9 and 10, the outlet surfaces 62 of the cores 51 can by angled between 20 and 70 degrees against the frontal plane 84 of the open medical system 30 as indicated by arc 82. This orients the outlets 63 mounted to the cores 51 at an angle so they reach out to the user allowing more user friendly and ergonomic use. This angle prevents devices plugged directly into gas outlets such as flow meters 170 or blenders from projecting outside of the footprint of the open medical system 30. Footprint ordinarily means the area defined by four planes that are parallel to the two axes 76 and 77 and tangent to the long edges 41 and the short edges 42 of the upper and lower plates 34, 35, when the tangents to the plates 34, 35 are drawn disregarding indentations 39 in the plates. This definition of footprint assumes that the cores and spacers are located within the perimeter of the plates. If the spacers are attached outside of the plates, as with brackets, or the cores extend beyond the plates, such as they would if cantilevered over the plates, the footprint should be determined as defined above, as if the plates extended until the cores and spacers were within the perimeter of the plates.

Allowing equipment, accessories, and storage items attached to a system to be located within the footprint of the system permits efficiency and consumes less floor space. This is achieved by the synergy of the open space 38, the contoured equipment rails 131, 201 the appropriately-angled outlets 63 in cores 51, an appropriately contoured lower plate 35 and cover 290, and a recessed base assembly 90. A user is able to configure and fully equip an open medical system 30 within the confines of the footprint of the open medical system 30, achieving savings in cost, productivity, and space utilization, and improving safety as well as the visual and auditory aesthetics of the patient care environment.

Some known medical systems, as manufactured, may offer a smaller footprint than the open medical system, but after similar medical equipment is placed in known medical systems by users, the effective footprint in these is larger that the effective footprint of the open medical system, because in known systems, the user-placed equipment hangs, projects or is otherwise located all or in part, outside the footprint of the known system measured without user-installed equipment. In contrast, most user-installed equipment installed on the open medical system remains within the footprint, and does not increase the floor space it occupies, unlike these known medical systems. As discussed in the above paragraphs, footprint refers to the floor area effectively occupied by the open medical system. That floor area can increase when a medical system is loaded with medical equipment by the user, but an advantage of the open medical system is that most medical equipment can be loaded on the system without increasing the effective footprint with user-loaded equipment over the footprint as manufactured.

While the preferred angle between the frontal plane 84 and of outlet surfaces 62 of the cores 51 is between 35 and 55 degrees, outlet surfaces that are positioned at angles between 70 and 90 degrees, or between 0 and 20 degrees to the frontal plane 84 will work in many instances, such as may be required when enclosing especially bulky, auxiliary electrical equipment such as circuit breakers, within the cores 51.

Unlike known systems, there are no horizontal structures for holding utility outlets. This leaves an open space 38, within the open medical system 30 between the two opposing cores 51 and the upper plate and lower plate, free of any permanent structures, and gives the user broad discretion in deployment of equipment and accessories.

Figure 15:
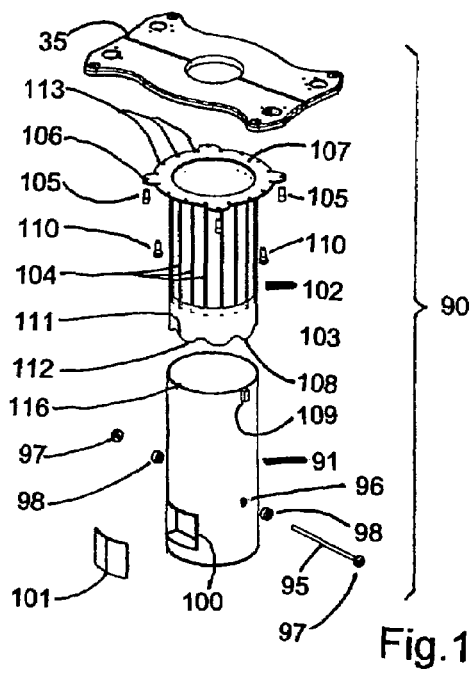
FIG. 15 shows an exploded view of the rotating base assembly.
Figure 15A:
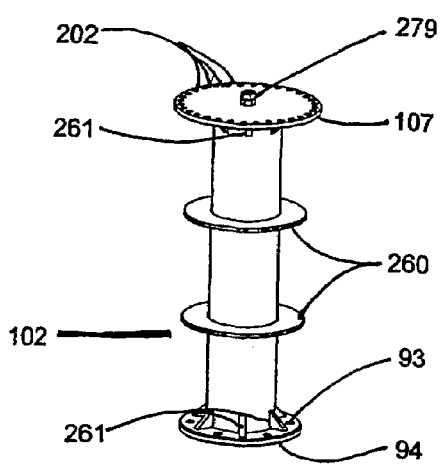
FIG. 15a shows an oblique perspective view of an alternative inner base.
Figure 16:
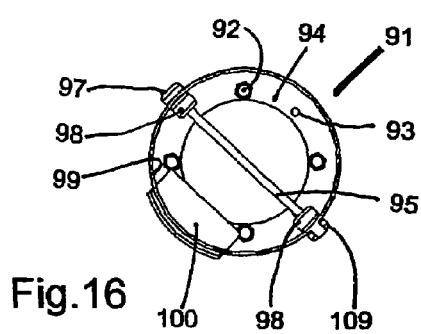
FIG. 16 shows a top view of outer base.

The main assembly 31 should be positioned within easy reach of the user. The main assembly 31 may be supported at the proper level by a support such as a base assembly 90 that provides stability and, optionally, rotation about its vertical axis. As shown in FIGS. 15 and 16, one embodiment of the base assembly 90 consists of an outer base 91 that can be firmly attached to the floor and leveled as a permanent installation during rough-in installation by using several bolts 92 anchored in the floor through holes 93 in the base flange 94.

The capability of rotating the open medical system 30 further increases staff productivity because the relationship of patient bed, care giver work area, and support equipment can be customized and adjusted but hew user for maximum staff effectiveness and work flow efficiency. The base assembly can be fixed, or made to rotate. As shown in FIG. 15, using an axle 95 installed through two holes 96 placed in the lower portion of the outer base 91 at a right angle to the vertical axis of the outer base 91. External end caps 97 retain the axle in position.

Internally to the outer base 91, two bearings 98 are attached in concentric and rotating relationship to the axle 95. Each bearing 98 is retained in close proximity to the inner wall 99 of the outer base 91, held in position by a snap ring, set screw, internal spacer or other device. Below the axle 95, an optional recessed box 100 allows installation of optional utilities, such as water and dialysate used in dialysis. A cover 101 covers the opening. The preferred embodiment of the outer base 91 is a tube. However, the outer base can be any shape, as long as a rotating element can be securely guided in it.

As shown in FIGS. 15 and 16, the main assembly 31 is aligned and secured to the outer base 91 to assure a coaxial, rotating relationship of the vertical axes of these components by means of an inner base 102 that extends coaxially into the center of the outer base 91. The outer surface 103 of the inner base 102 is fitted with a bearing means that reduces friction between it and the inner wall 99 of the outer base 91, and to prevent looseness in fit.

Bearing means include low-friction bumper strips 104 applied to the outer surface 103 of the inner base 102 as shown in FIG. 15, or any other type such as circumferential bearings or bushing rings made from low-friction plastic such as HDPE or Nylon, by ball bearings, or by any other, suitable method.

As shown in FIG. 15, the inner base 102 is firmly attached to the underside 40 of the lower plate 35 such as by means of bolts 105 attached through mounting lugs 106 extending from the mounting flange 107. The main assembly 31 can be positioned onto the anchored outer base 91 by lowering the inner base 102 into the outer base 91 until the undulating lower edge 108 of the inner base 102 comes to rest on the two bearings 98 located on the axle 95, a structure that permits the main assembly to rotate freely.

Users exert occasional tangential forces on the open medical system 30 such as when a connector is plugged into an outlet 63 or a pushbutton is pressed. As shown in FIGS. 15 and 16, an indexing detent mechanism in the base assembly 90 resists these forces, and reduces excessive rotation of the system from the forces. The detent mechanism includes an undulating lower edge 108 on the lower edge of the inner base 102 which, when rolling over the bearings 98 inside the outer base 91, causes slight movement of the main assembly 31 along its vertical axis. As a high spot 111 in the undulating lower edge 108 moves over the bearings 98, the entire open medical system 30 settles into a stable position. To rotate the open medical system, the user must exert enough tangential force by, for example, pushing on the vertical spacers 36 so that the next low spot 112 in the undulating lower edge 108 rolls across the bearing 98 and the unit settles into the next high spot 111. The frequency and depth of undulations 108, as well as the diameter of the bearings 98, can be adjusted to achieve any desired degree of resistance and rotational increments.

Figure 17:
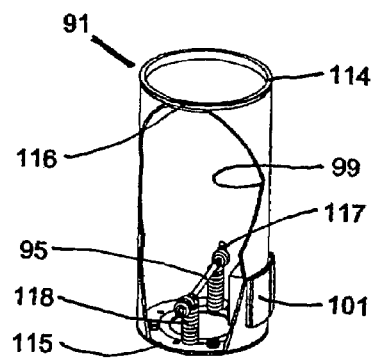
FIG. 17 shows a perspective cut-away view of an alternative rotating base assembly.
Figure 18:
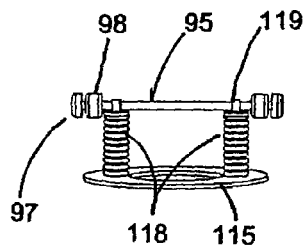
FIG. 18 shows a perspective view of an alternative indexing assembly.
Figure 19:
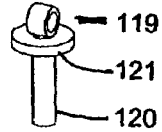
FIG. 19 shows a perspective view of an axle guide bushing.

Alternatively, as shown in FIGS. 17, 18 and 19, instead of requiring a user to cause the entire main assembly 31 to shift vertically with each indexing motion, the full weight of the main assembly 31 can be supported by a bearing 114 attached to the upper end 116 of the outer base 91 such as by friction fit, mechanical fasteners or adhesive bonding. Specifically, the mounting flange 107 of the inner base 102 rests on the bearing 114 to provide smooth rotation of the main assembly 31 on the outer base 90 which reduces effort. The desired indexing can be provided by an indexing assembly 115, to upwardly bias the axle 95 that carries the bearings 98 so that the axle 95 deflects vertically inside of the vertical slots 117 in the outer base 91 to flexibly engage the undulations 108 on the lower edge of the inner base 102. The springs 118 are retained in proper engagement between the base flange 94 and the axle 95 by means of axle guide bushings 119. Concentricity guides 120 depend into the inner lumen of the springs 118 to keep coaxial alignment, and support flanges 121 act against the biasing force of the springs 118 to retain the springs 118 in general alignment with the axle 95 on which the bearings 98 are supported. The springs 118 urge the bearings upward and into rolling engagement with the undulation 108 to provide enough resistance between undulations 108 and bearings 98 for tactile and audible indexing.

For the open medical system 31 described herein, with upper and lower plates 34, 35 sized 45.72×81.28 cm (18×32 inches), vertical spacers 36 of 142.24 cm (56 inches) length, and an outer base 91 of 35.56 cm (14 inches) diameter and 45.72 cm (18 inches) high, bearings 98 preferably have a diameter between 0.64 and 2.54 cm (0.25 and 1 inch), the frequency of undulations 108 as measured between successive high spots 111 are preferably between 0.25 and 2.54 cm (0.1 and 1 inch), and the amplitude, as measured between a tangent to the high spots 111 and a tangent to the low spots 112, are preferably between 0.64 and 2.54 cm (0.25 and 1 inch).

Alternatively, as shown in FIG. 15, other profiles for indexing and complementary bearing diameters can be used to make indexing increments finer or coarser, and indexing resistance lighter or harder. In an alternative embodiment, the axle 95, with a diameter of between 0.97 and 1.91 cm (0.38 and 0.75 inches), without the use of bearings 98, is in direct engagement with the undulations 108 of a frequency of between 0.97 and 1.91 cm (0.38 and 0.75 inches), and an amplitude of 0.25 to 1.91 cm (0.1 to 0.75 inches).

For open medical systems 30 that rotate, it is necessary to restrict the degree of rotation so that users cannot inadvertently twist or damage the utility service lines by excessively rotating the main assembly. The main assembly is preferably first installed in an orientation in which one long side is approximately parallel to the wall at the head of the bed or beds in the medical facility. Rotation preferably is limited to 180 degrees in each direction from this orientation upon installation. As shown in FIG. 15, one embodiment of the open medical system 30 incorporates a stop lug 109 attached to the upper edge 116 of the outer base 91, such as by fasteners or welding. At least one threaded stop pin 110, removably arrests rotation when it comes in contact with the stop lug 109. Stop pin 110 is attached, such as by threading it into tapped holes 113 in the mounting flange 107 that form a bolt circle around the inner base 102. By inserting a stop pin 110 on either side of the stop lug 109, the installer can determine the permitted scope of rotation and the end points of rotation. Optionally, one or two additional stop pins 110 can be permanently installed by the manufacturer, such as by welding, to prevent excessive rotation if the user accidentally omits to install the removable stop pins 110.

A rotating base provides a cost-effective method of providing the adjustability desired by care givers. However, a less costly embodiment uses a fixed and non-rotating base provided by attaching, such as with bolts or by welding, the mounting flange 107 directly to the outer base 91 and attaching the flange 107 to the lower side 40 of the lower plate 35 by bolts 105.

Preferably, flexible conduit for electric power and hoses for medical gases may be used for the utility service lines 165 to permit the main assembly 32 to be rotated on the base assembly 90 during installation or during use.

FIGS. 15a, 15b, 18a and 18b show a simple, cost effective alternative base assembly 90, comprising an inner base 102 having two ends, a base flange 94 attached to one end, and a mounting flange 107 attached to the other end, such as by welding. Optional gussets 261 may be placed between the inner base 102, the mounting flange 107 and the base flange 94 to reinforce the base assembly 90. The base flange 94 with a plurality of holes 93 may be bolted, by means of bolts 92 or otherwise attached, to the floor of the medical facility. Optional cement anchors or other mechanical devices typically used in building construction may be used.

Alignment is achieved by aligning means, such as an alignment pin 279 on the mounting flange 107, and a plurality of mounting holes 202 arranged on mounting flange 107 on a concentric bolt circle. Centered on the outer surface 40 of the lower plate 35, and located at the intersection of the front-to-back axis 76 and the side-to-side axis 77 of the lower plate 35, is a bolt circle of threaded mounting holes 200, as well as a blind alignment hole sized to rotatably receive the alignment pin 279 that protrudes upward from the base mounting flange 107. The mounting holes 202 on the bolt circle of the mounting flange 107 align with the threaded mounting holes 200 on the plates 35. Numerous other alignment means and arrangements of attaching the main assembly 31 to the base 90 would substitute satisfactorily.

The base assembly 90 may be attached to the floor during rough-in installation and before the delicate main assembly 31 is brought to the job site. After the inner base 102 has been bolted to the floor using base flange 94, the rough construction is finished, and the job site has been cleaned, the main assembly 31 of the medical system 30 may be fastened to the base assembly 90 at any desired angle of rotation in respect to base 90. By inserting bolts 105 through the mounting holes 202 of the mounting flange 107 and tightening them in the threaded mounting holes 200 on the outer surface 40 of the lower plate 35, the assembly is locked into position and secured.

The angle of rotation of the main assembly 31 to the base assembly 90 can be adjusted after installation with minimal disruption, by removing the bolts 105, rotating the main assembly 31 to a new angular position in relation to its environment, and re-attaching the main assembly 31 to the mounting flange 107, as described above.

Figure 15B:
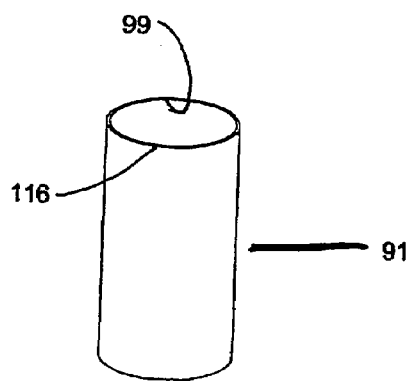
FIG. 15b shows an oblique perspective view of an alternative outer base.
Figure 18B:
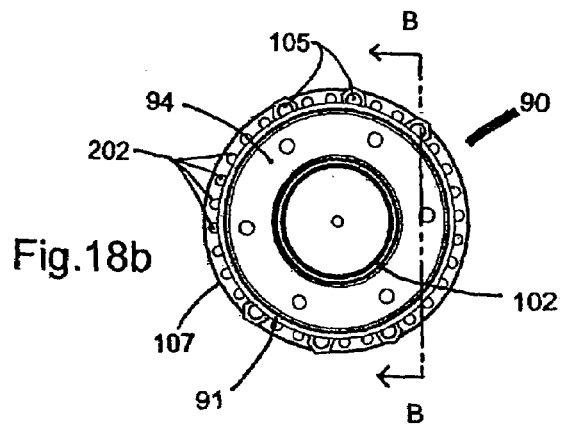
FIG. 18b shows a bottom elevation of an alternative base assembly.
Figure 18A:
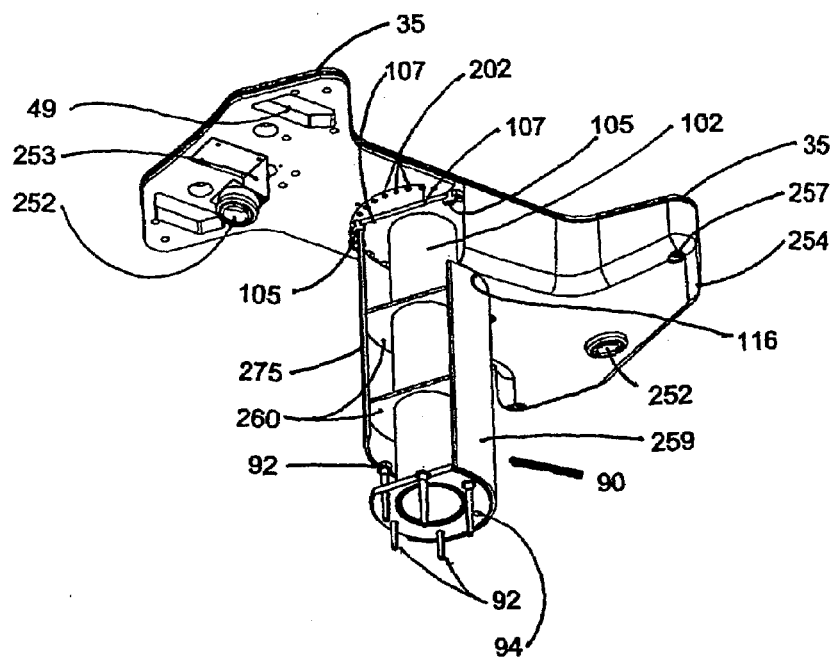
FIG. 18a shows an oblique cut-away view of the underside of a lower plate with one cover module removed and the base assembly partially cut away, as indicated by section lines B—B in FIG. 18b.

As shown in FIGS. 15b and 18a, an outer base 91, shorter than the total height of the inner base 102, and with an inner diameter appropriately larger than the outer diameter of the alignment plates 260, may be placed over the inner base 102 during rough-in installation of base 90 to the floor. Preferably, the base flange 94 and alignment plates 260 are of similar diameter. A plurality of concentric alignment plates 260, also attached to the inner base, restrain the outer base 91 in concentric alignment with the inner base 102.

The method of installing the open medical system 30 shown in FIG. 18a as a cut-away view of the base assembly 90, shows the outer base both in its up position (rear) and down position (front). The outer base 91 may freely slide from an up position 275 to a down position 259 on the inner base 102. Vertical travel of the outer base 91 is limited on the up side by the mounting flange 107 and, on the down side, by the floor.

During installation, the outer base 91 is raised to the up position 275 to gain access to the bolts 92 by which the base flange 94 is fastened to the floor. After final tightening of the bolts 92, the outer base 91 is lowered to position 259 where base 91 touches the floor and hides the bolts 92. When the outer base 102 is in its down position 259, the upper edge 116 of the outer base 91 is concealed within the space 89 between the lower cap 37 and the outer surface 40 of the lower plate 35. Optionally, a bead of caulk or base cove may be applied to the outer base 91 at the floor line. This structure and installation method allows for convenient, efficient and cost-effective installation of the open medical system 30, while minimizing damage and vandalism associated with rough construction environments.

Preparing the utility service lines 165 that will connect the system 30 to the facility requires electric circuits, medical gas lines, and other utilities such as communications wires, and fiber optic cables, to be brought and roughed-in near the point where the open medical system will be installed. A preferred electric rough-in installation method involves an electrician terminating all flexible conduits leading to the system 30, using conduit fittings 238 at the conduit connection plate 247 after feeding the conduits trough the ceiling tube 122. The side feed holes 125 in ceiling tube 122 may be used to pull hoses, communications wires and other utilities from the facility through the space 89 into the cores without entering a transom wire compartment 239.

One advantage of the open medical system 30 is its recessed base assembly 90 that provides toe space to allow users to work close to the system and, due to the base assembly's small connection to the floor, facilitates cleaning of the floor.

Advantageously, the small footprint of the open medical system 30 also opens circulation space. As shown in FIGS. 1 and 15, the small footprint provides only a small connection area to the floor which can cause severe stress in the floor mounting bolts 92 by which the outer base 91 is anchored to the floor. To alleviate this stress, and to assist in keeping the open medical system 30 in proper vertical alignment over the base assembly 90 so it can rotate freely and is secure, the ceiling tube 122 can be secured to the ceiling structure by means of ceiling guide plate 126. This approach reduces the lateral loads on the base 91 while permitting the small footprint that is conducive to easy cleaning, good toe clearance for users, and unencumbered circulation space.

Using the ceiling guide plate 126 to secure the ceiling tube 122 of the open medical system 30 to the ceiling, in cooperation with a base assembly 90 that supports the full weight of the open medical system 30, the base structure can be as small as 2.45 cm (1 inch) in diameter. Thus, the ceiling guide plate 126 assures that the system 30 remains balanced vertically above the base assembly 90, and it provides resistance to lateral deflection caused by forces from accidental collisions with the open medical system 30, earthquakes, or other events. The ceiling guide plate 126 also improves the rotational characteristics of the open medical system 30 by keeping it vertically aligned and balanced above the base assembly 90. The ceiling guide plate 126 may be a panel made from a low-friction plastic sheet such as PVC, polyethylene or polypropylene, or other materials such as aluminum or steel, provided it has sufficient strength to resist lateral forces, and can be attached to the ceiling. The ceiling guide plate 126 is in rotational contact with the ceiling tube 122 but does not provide significant resistance to vertical movement of the ceiling tube 122, either during installation or use, including during rotation of the open medical system.

When the open medical systems 30 is being installed, the ceiling guide plate 126 generally may be anchored above, and in vertical axial alignment with, the base assembly 90 by either attaching the ceiling guide plate 126 to the suspended ceiling structure or to the ceiling and walls above the suspended ceiling using fasteners and angle brackets such as are typically used in plumbing and HVAC installations. A cut-out ceiling tile through which the ceiling tube 122 penetrates may be used to complete the installation.

The ceiling guide plate 126 can, optionally, incorporate a commercially available bearing. Optionally, as shown in FIGS. 1a and 1b, the ceiling tube 122 can be dedicated for use as a conduit for utility connections 165 without restraining it at the facility's ceiling structure, and without using the ceiling guide plate 126 as an auxiliary support element. In a further variation, the juncture, where the ceiling tube 122 is attached to the outer surface 40 of the upper plate 34 using central cover 241, is appropriately reinforced to permit the main assembly 31 to be suspended from the ceiling of a medical facility without requiring a base assembly 90, as shown in FIG. 20.

As shown in FIGS. 1 and 5, a top cover 37 is provided to close the open medical system above the upper plate. In accordance with hospital accreditation standards for horizontal equipment surfaces above eye level, the top surface 168 of the top cover 37 is slanted at an angle 83 between 5 and 60 degrees relative to the outer surface 40 of the upper plate 34, to minimize dust accumulating on the main assembly and to make it easier to clean than a flat upper plate. The slanted top surface 168 creates a space 89 between the top cover 37 and the outer surface 40 of the upper plate 34, which can be used to route utility supply lines.

Transom 127 may be attached to the lower surface of plate 34 as shown in FIG. 2, or to the outer surface 40 of upper plate 34. Additionally, transom 128b also may be attached to the upper surface of the plate 35 using mounting flanges 129, as shown in FIG. 6. Optionally, transom 127 also may be attached to the upper surface of plate 34, and transom 127 also may be attached to the outer surface 40 of plate 35 using mounting flanges 129. FIG. 5A shows, in longitudinal section, an optional top cover 37 of greater depth 243, which provides an increased enclosed space 89 between the top cover 37 and the outer surface 40 of the upper plate 34. The top surface 168 of this alternative top cover 37 is convex and curved and, in this embodiment, has a radius 220 between 40.64 and 81.28 cm (16 and 32 inches) to prevent dust collection and make cleaning easy. This alternative embodiment of the top cover 37 is sized to enclose transom 127 attached on the outer surface 40 of upper plate 34 using mounting flanges 129, in which transom 127 the wire connections between the facility's wires 165 and the factory installed wires 204 are made during installation of the open medical system 30. Additionally, this alternative embodiment of the top cover 37 also is sized to enclose hoses 249 and other utilities, such as phone or data transmission lines that may not be routed through the electrical compartments of the transom according to building codes. Such additional utilities, including hoses 249, data wires, and phone lines, may be brought into the open medical system 30 through the ceiling tube 122, and pulled through feed holes 125 into the portion of the space 89 between the top cover 37 and the upper plate 34 that is not occupied by the transom and, from space 89, can pass into the cores through the feed holes 49. Alternative top covers 37 in which all or part of the top surface 168 is horizontal to achieve increased internal volume, are within the scope of this invention.

Figure 7C:
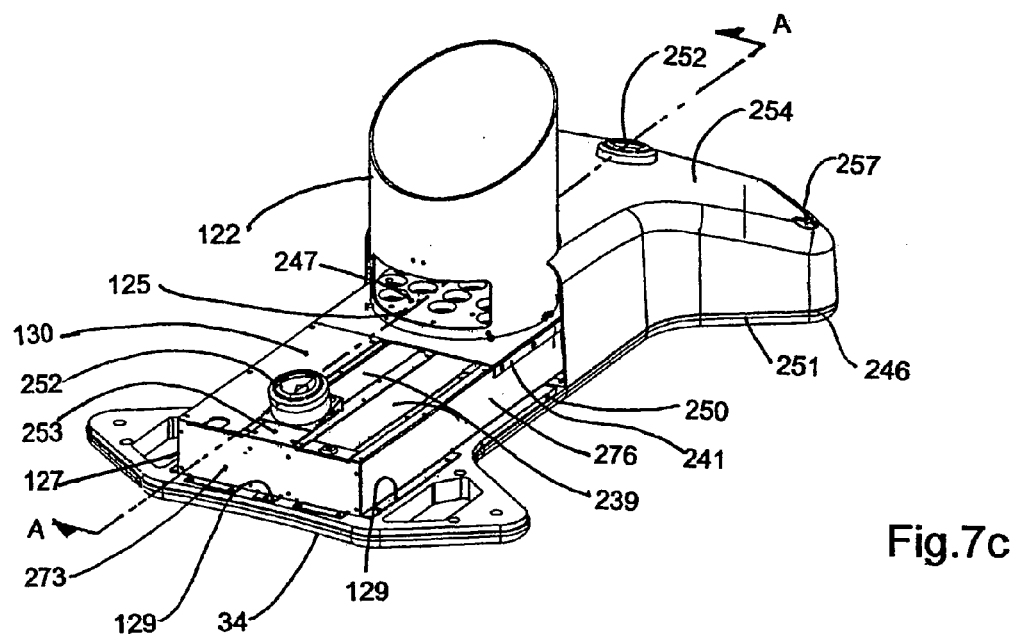
FIG. 7c shows an oblique view of the top surface of the upper plate with one cover module and several electrical compartment covers removed and the ceiling tube partially cut.
Figure 7D:
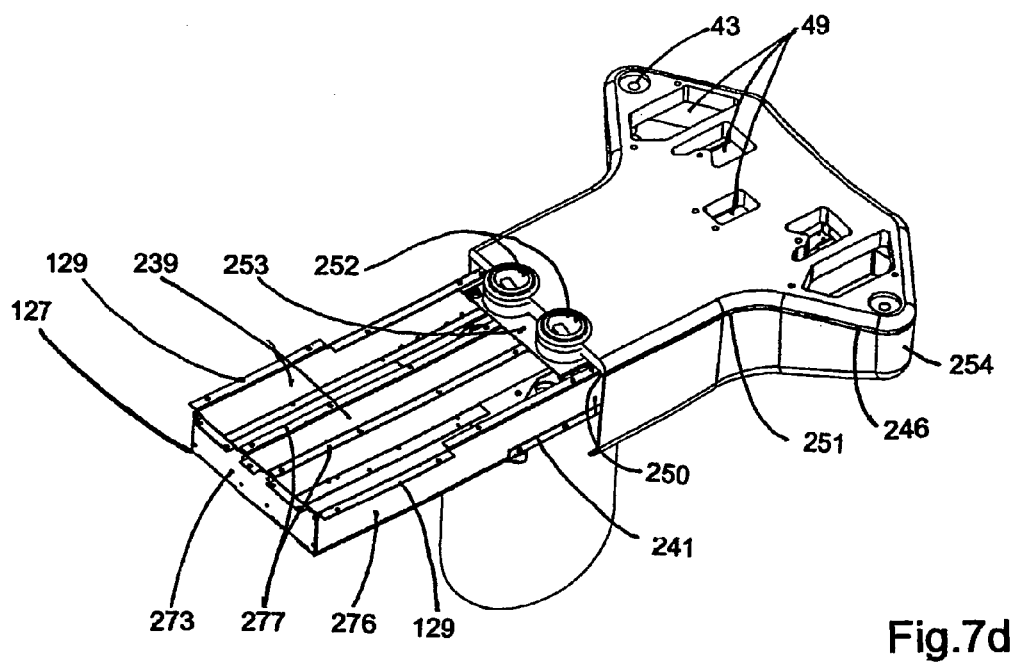
FIG. 7d shows an oblique upside-down view of the underside of an upper plate with half the upper plate removed at its transversal center line, and with one cover module removed.

FIGS. 6b, 7c and 7d show the top cover 37 engaging, along its edge 258, the alignment step 250 that runs along the perimeter of the outer surface 40 of upper plate 34. The outer surface 246 of the contoured edge of the upper plate 34, and the outer surface of the top cover 37 near its interface with plate 34, are aligned to minimize any gaps between them. Optionally, any crevices that might result may be sealed with a bead of caulk or sealant to facilitate infection control.

FIGS. 1c and 1d show a preferred embodiment using top cover 37 on the outer surface 40 of plate 34 and a substantially identical bottom cover 290 on the outer surface 40 of the bottom plate 35 to enhance manufacturing efficiencies and lower cost through modularity. Optionally, the top cover 37 and bottom cover 290 may be comprised of two cover modules 254 of the same size that may be joined either at their transversal edges 295 or at their longitudinal edges 289 to achieve further manufacturing efficiencies, cost savings and easier service access. In this alternative, the external diameter of both the ceiling tube 122 and the outer base 91 are approximately the same, for example 20.32 cm (8 inches), permitting interchangeability of the top cover 37 and bottom cover 290 and top and bottom cover modules 254, and enabling further manufacturing efficiencies at a lower cost. Optional holes 255 may be cut into covers 37, 290, and modules 254 in alignment with optional lighting components 252 that may be attached to the outer surfaces 40 of the plates 34, 35.

The top cover 37 generally follows the perimeter of the upper plate 34, and preferably is made from flame resistant, pressure-formed sheet plastic, but can be made using many alternative materials and manufacturing processes, including metal fabrication or fiberglass lay-up.

Utilities are routed into the open medical system via a utility connection 32, which is a structure through which connections to utilities reach the main assembly. As shown in FIGS. 2 and 6, the top cover 37 and ceiling tube 122 is one embodiment of a utility connection 32 which encloses the utility lines that run from the ceiling through the ceiling tube 122 to the cores 51. The top cover 37 rests on the upper plate 34 in its down position and may be secured to the ceiling tube 122 so that it can be slid up along the ceiling tube to reveal the wiring feed holes 125 in the lower portion of the ceiling tube 122 and feed holes 49 and 50 in the upper plate 34 through which an installer can connect the unit to utilities. The top cover 37 also serves to conceal fasteners such as nuts 45 and screws 47.

An alternative utility connection 32 uses transoms 127, 128 to supplement the top cover 37 in routing utility service lines 165 from the ceiling to the cores 51. As shown in FIGS. 2 and 6, the utility service lines 165 may be pulled down through the ceiling tube 122 to exit on the bottom side of upper plate 34. Utility service lines, such as wires and hoses, that are not fished sideways through feed holes 125 but travel through the upper plate 34, may be contained in an upper transom 127 that distributes the utility service lines to the two cores 51. Alternatively, there also can be a lower transom 128, through which auxiliary wiring can be fed along the lower plate 35 between cores.

Transoms 127, 128 preferably are rigid, flat, elongated sheet metal structures interconnecting the cores 51. The transoms are open toward, and are attached to, the upper and lower plates 34, 35, such as by transom vertical sidewalls having flanges 129 through which the transoms are screwed to the upper or lower plates 34 and 35 respectively. The transoms 127, 128 can also be attached to upper and lower plates 34, 35 by welding or any other suitable means. The transoms 127, 128 can be provided with covered access openings 130 to facilitate connection of the main assembly 31. The transoms also add rigidity to the upper and lower plates.

Figures 25, 26:
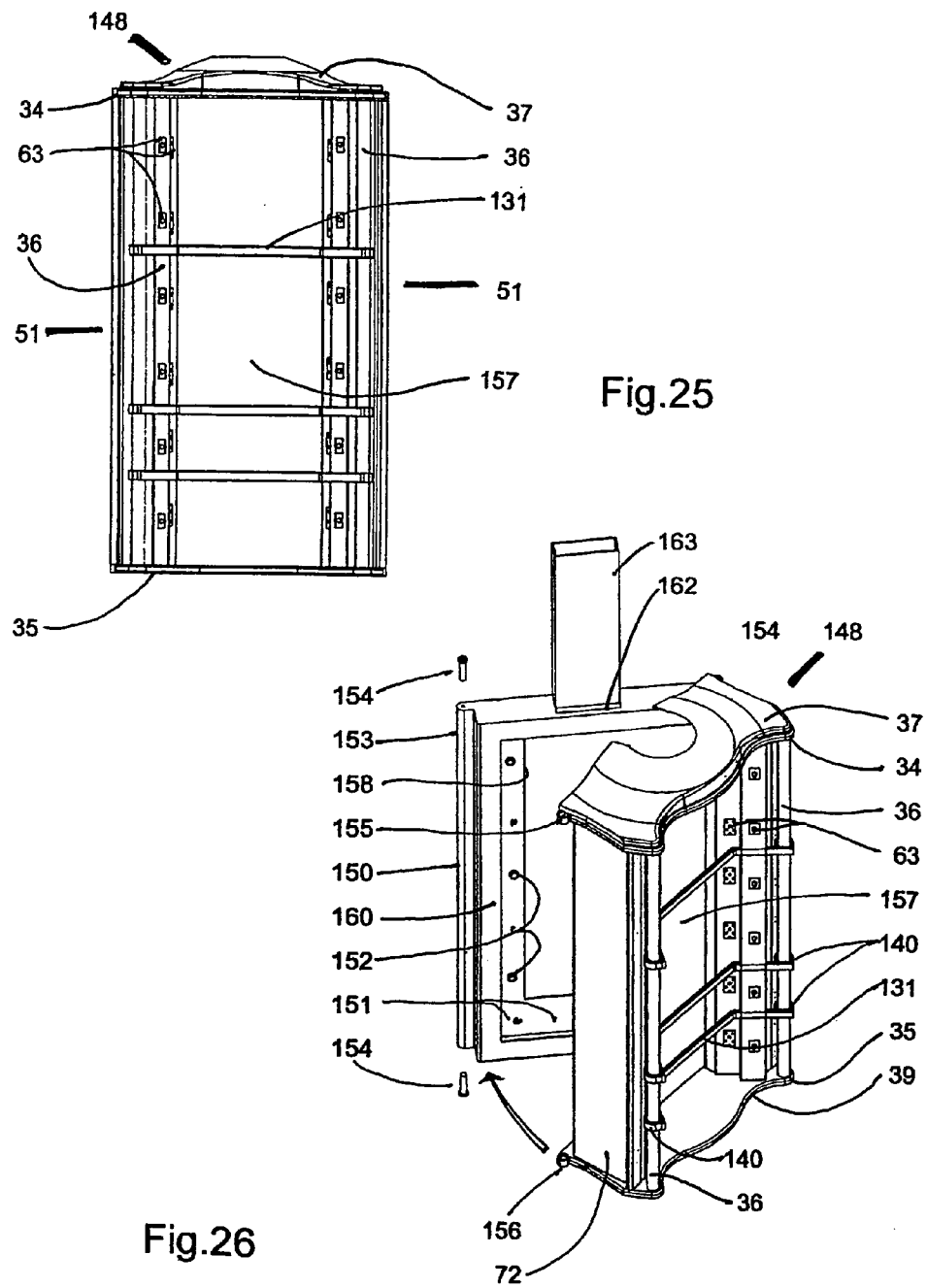
FIG. 25 shows a front elevation of wall mounted version.
FIG. 26 shows an oblique frontal view of wall mounted version installed to wall mounting bracket.
Figure 26E:
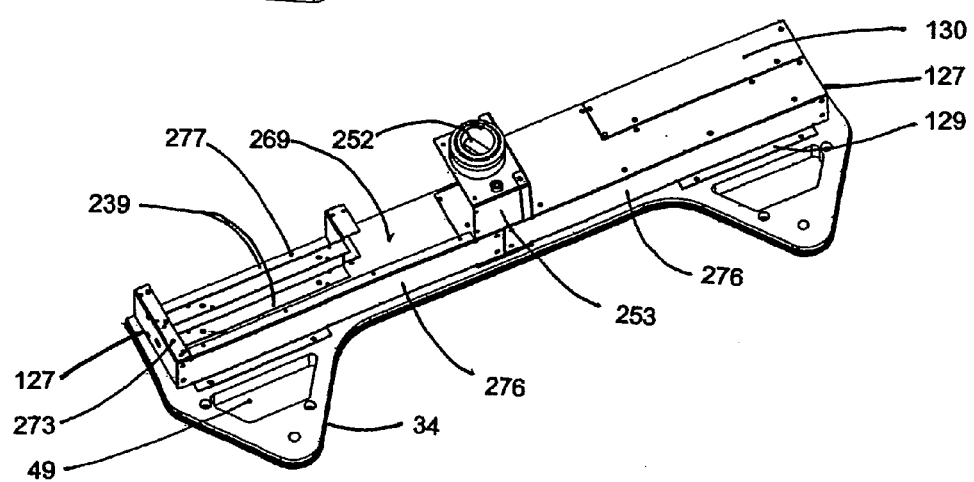
FIG. 26e shows an oblique view of the top surface of the system of an alternative wall mounted version with the cover module and several electrical compartment covers removed.

As shown in FIGS. 26e, 26f and 26g, a transom 127 may be used with the wall mounted version 148. In this embodiment, transom 127 is constructed of individual flanged panels such as front panels 276 and end panels 273 which close off the ends of transom 127. Transoms 127, 128 can optionally be constructed as one-piece channels as shown in FIG. 2, from a continuous, notched blank or, preferably, by assembling individual components such as front panels 276, end panels 273, and optional separator panels 277, with known methods such as welding, screwing or bonding, as shown in FIGS. 7c, 7d, 26e and 26f. Transoms 127, 128 may also be cast or molded, using metals such as aluminum, resins or other materials with appropriate dielectric and structural properties.

In the alternative shown in FIG. 7c, the upper transom 127 may be attached through flanges 129 to the outer surface 40 of the upper plate 34. In this embodiment, the upper transom 127 may be additionally subdivided into individual wire compartments 239 corresponding to the feed holes 49 in the upper plate 34 that accommodate electric wires 204 and 248. Other feed holes 49 may be provided in the plates 34, 35 to allow hoses 249, tubes and accessory wires, such as communications wiring and fiber optic cables carried through the ceiling tube 122 from the facility's service connections to the cores 51, to bypass the transoms 127, 128, so that isolation within the transoms of different types of power, such as emergency power and regular power, can be maintained without contamination, as shown in FIG. 5a.

Collectively, as shown in FIGS. 5a, 7c and 7d, the wire compartments 239 of transom 127, 128, and the covered access openings 130 of transoms 127, 128, may be a closure means such as a single, continuous cover or, optionally, individual covers spanning one or several wire compartments 239 to make the wire compartments 239 electrically safe and permit independent access to any one of the separate wire compartments 239.

A central cover 241, and a conduit connection plate 247 removably attached to it, accept electrical conduit fittings 238 during electrical rough-in installation. The installer should correctly place the fittings 238 and the utility service lines 165 descending from the ceiling through the ceiling tube 122, so that that all electric service lines will be routed to the appropriate wire compartments 239, which may be dedicated to special uses, such as for emergency power or regular power. During rough-in installation and before the main module 32 is positioned in the final installation step, the installer also should assure that each of the utility service lines 165 is appropriately terminated at the conduit connection plate 247 of the central cover 241 to assure that, during final installation of the main module 32, the wires 248 intended for connection to the factory-installed internal wires 204 and outlets 63 of a specific quadrant 78, 79, 80 or 81, will align with the wire compartments 239 that are communicating with the feed holes 49 of that quadrant.

The method of rough-in and final installation of electric wiring described in this invention requires that the wires 204 leading to an outlet 63, and the location of the outlet 63 in the quadrant 78, 79, 80 or 81 to which it connects, be positively identified. The disclosed method assures that the intended outlet location, and its respective circuit in the main assembly 32, are clearly communicated to the installer so he or she will correctly connect the service line 165 containing that circuit to the appropriate knock-out located in the conduit connection plate 247 to assure mating with the appropriate wire compartment 239 during final assembly of the open medical system 30.

Optionally, brackets 253 may also serve to attach one or more lighting components 252 to protrude downward through one or more clearance holes 256 cut in the upper plate 34 to provide task lighting for the open space 38 of the open system 30, or to protrude through clearance holes 255 cut into covers 37, 290, and cover modules 254 to provide upward lighting above the upper plate 34 to be reflected from the ceiling, or downward nightlights directed at the floor below the bottom plate 35.

Alternatively, appropriately shaped brackets 253 may be attached directly to the plates 34, 35 or to other internal structures such as transoms 127, 128. Lighting components 252 may also be attached to the covered access openings 130 or directly to the covers 37, 290, and cover modules 254. Optionally, the lighting components 252 may also be attached directly to the covers 37 and 290, the cover modules 254, the plates 34, 35 or the transoms 217, 128.

As shown in FIGS. 6b, 7c and 7d, a perimeter step 250 may be incorporated in plates 34, 35 adjoining the outer surfaces 40 to minimize the gap 251 between covers 37, 290 and plates 34, 35, as well as the gap 251 between cover modules 254 and plates 34, 35. Covers 37, 290, and cover modules 254 may mate with the plates 34, 35 along the perimeter step 250 to make the gap 251 less prominent and make the outer surface 246 on the perimeter of plates 34,35, less susceptible to damage, safer, and more pleasant for users to touch.

As shown in FIG. 20, both the connection 32 and the support 33 also can be located exclusively above the open medical system, as shown in configurations 85 and 86, using any of several commercially available, known articulated arms or swiveling ceiling supports such as are commonly installed for supporting x-ray equipment, anesthesia machines and operating room lights. These known devices typically are structurally mounted to the hospital room ceiling or ceiling support structure, and can range from rigid, non-rotating drop tubes or rotating drop tubes, to articulated arms that permit the open medical system 30 to move freely about the room. Further, as shown in configurations 85 and 86 in FIG. 20, the utility connection 32 and the support 33 can be combined in a single structure 88.

Figures 21, 23:
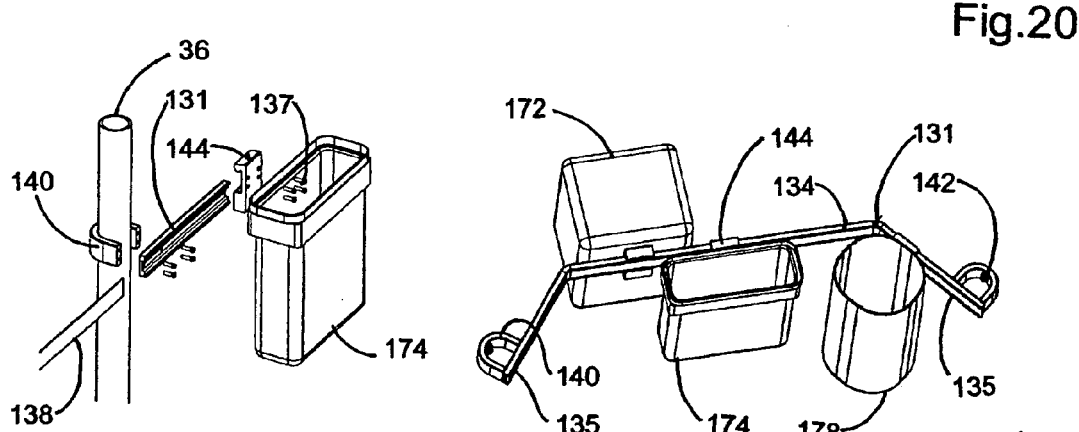
FIG. 21 shows a perspective view of contoured equipment rail with exemplary accessories attached.
FIG. 23 shows an exploded view of accessory clip-on adapter and mounting detail of a contoured equipment rail to a vertical spacer.
Figures 22, 24:
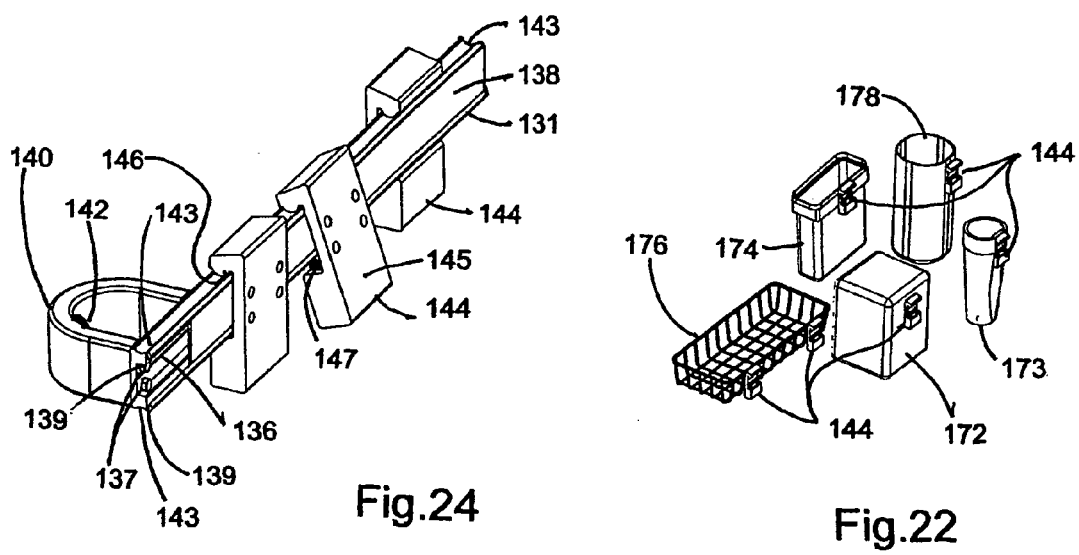
FIG. 22 shows several stylized accessories that might be attached by a user to contoured equipment rails.
FIG. 24 shows a perspective view of a contoured equipment rail and accessory adaptor clips.

As shown in FIG. 1, an advantage of the open medical system 30 is the unencumbered open space 38 between the two cores 51 that minimizes visual obstruction in the patient room and allows users to arrange their equipment with fewer constraints. Equipment can be attached to contoured equipment rails 131 that a user can movably attach to the vertical spacers 36, as shown in FIGS. 21, 23 and 24.

Several elements permit care givers to use this open space 38 to meet the individual, changing requirements of their care giving tasks. The contoured equipment rails 131 can be attached by the user to the vertical spacers 36 at any desired level, and serve to accept a wide variety of medical devices 172, storage devices and accessories. Medical devices may include devices such as patient monitors, sphygmomanometers, pressure transducers, and other items used in intensive care. Storage devices may include devices such as organizers for supplies, storage baskets 176, storage trays, waste containers 178, and suctioning bottles 173. Accessories may include devices such as fold-out writing surfaces 171, marker boards, and panels to which patients' families can attach photographs and other personal items. Each of these devices may be fitted with a mating adapter clamp 144, as shown in FIGS. 21 through 24. Contoured equipment rails 131 are typically made from extruded aluminum or other metal.

The contoured equipment rail 131 may include a recessed groove 136 to accommodate the heads of mounting screws 137 by which it is attached to the rail mounting clamps 240. The fasteners 137 can be concealed by a fascia strip 138 of sheet material such as colored melamine that is inserted between opposing fascia grooves 139.

An advantage of the current invention is that the contoured equipment rail 131 can be contoured to follow the general shape of the cores 51. As shown in FIGS. 6, 7 and 21, contoured equipment rails with a straight rear segment 134 and two angled side segments 135 allow the rails 131 to hug the cores 51, and pieces of equipment and accessories fitted with adaptor clamps 144 will project into the open space 38 and ordinarily will not extend beyond the footprint of the overall unit 30, as in many known medical systems. This allows equipment to be attached anywhere along each flat stretch of a contoured equipment rail 131 by means of adapter clamps 144 and thus will accommodate most devices needed by care givers within the footprint of the open medical system 30.

Figure 11:
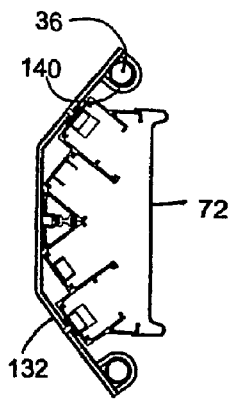
FIG. 11 shows a top view of a core using an alternative contoured inner equipment rail.
Figure 12:
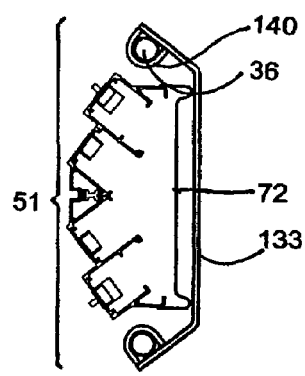
FIG. 12 shows a top view of a core using an alternative contoured outer equipment rail.

As shown in FIGS. 11 and 12, a variety of alternative contoured equipment rails can be used, such as a contoured inner equipment rail 132 that extends between two vertical spacers 36 along the entire inner surface 54 of a core 51 without crossing over to the other core, or a contoured outer equipment rail 133 that extends around the outward face 53 of the core 51 across a side panel 72 to provide additional attachment means for a user.

Equipment rails are contoured to make the open space 38 practical for typical, user-configured arrangements of accessories, equipment and storage. Adapters 144 are typically mounted to the rear surfaces of equipment so that the equipment can be placed on the rails facing the user, as shown in FIGS. 21 and 22. The open space 38 can be utilized to the fullest when the equipment rails surrounding the open space 38 are placed as close as possible to the vertical sides and, where used, partition modules 166 so that contoured equipment rails 131 will position the adapters 144 close to the vertical surfaces surrounding the open space 38. Contoured equipment rails can be made of different depths depending on their intended use, and equipment rails of different depth can be used on the same system 30. FIG. 7a shows a contoured rail 131 that will not interfere with an optional partition module 166, and clear another, similar contoured rail 133 attached to the open medical system 30 from the opposite side.

Two optional contoured rails 131 and 201 of different depth are also shown in FIG. 7a, that may allow items such as storage baskets 176 to be placed on the rail surface away from the user, as seen in FIG. 21, so the item can be reached equally well from both sides of the open medical system while additional equipment may be placed on the rail surface that faces the user, which generally is the side away from the front-to-back axis 76. The depth of contoured equipment rails 131, 201 is sized depending on the depth of the open medical system, but generally can range from 7.62 to 38.1 cm (3 inches to 15 inches), as measured from the frontal plane 84 to the rail's rear segment 134. Preferred embodiments of contoured equipment rails 131 and 201 have a depth between 12.7 and 25.4 cm (5 inches and 10 inches).

As shown in FIGS. 21, 23 and 24, rail mounting clamps 140 are provided at each end of a contoured equipment rail 131 to removably attach the contoured equipment rail to a pair of vertical spacers 36 by means of fasteners, such as screws 137, and positioning the contoured equipment rail 131 adjacent to the vertical posts 36 at the desired height. Rail mounting clamps 140 and cooperating contoured equipment rails 131 attach behind the vertical spacers 36 using screws 137 or other attachment means. A high-friction elastomeric bumper 142 is embedded in the inside of each rail mounting clamp 140 to provide controlled resistance when a clamp is set on a pair of vertical spacers 36 and to prevent the equipment rail from dislodging. The use of an elastomeric bumper 143 is optional.

Contoured equipment rails 131 have opposing, radiussed upper and lower grooves 143, which are engaged by an adapter clamp 144 that has been attached to a piece of equipment or an accessory. As shown in FIG. 24, the adaptor clamp 144 is made to hang on the upper groove 143 of the contoured equipment rail 131 by means of an engagement nose 146. Equipment is attached on the upper groove 143 by placing the attached adapter clamp 144 at a slight angle and then rotating it into a vertical operating position at which point a pair of spring loaded plungers 147 in the base segment 145 of the adapter clamp 144 engage the lower groove 143. Adapter clamps 144 can be attached to both sides of contoured equipment rails 131. In combination, this adapter clamp and contoured equipment rail mechanism will accommodate almost any medical devices, storage devise and accessory devices that have been fitted with an adapter clamp. These devices can be quickly positioned and repositioned by a user, which offers great flexibility.

The open medical system 30 can be adapted to various alternative configurations such as wall mounting due to its modular construction. FIGS. 25 through 28 show a wall mounted version 148 of the open medical system, having two horizontal plates, an upper plate 34 and a lower plate 35, vertical spacers 36 separating the plates, two cores 51, a utility connection 32 and a support 33. To adapt the open medical system for wall mounting, the open medical system 30 of FIGS. 1 and 8 has been halved along its vertical axis such that each core 51 is split in half and consists only of one base module 52 facing toward the room.

Figure 27:
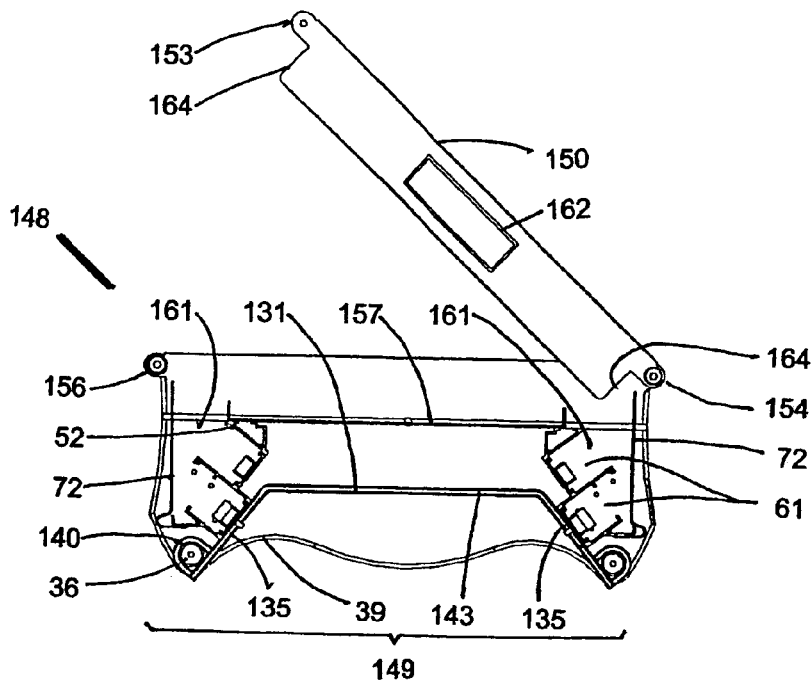
FIG. 27 shows a top-down perspective view into the wall mounted version with top panel and top cover removed.
Figure 28:
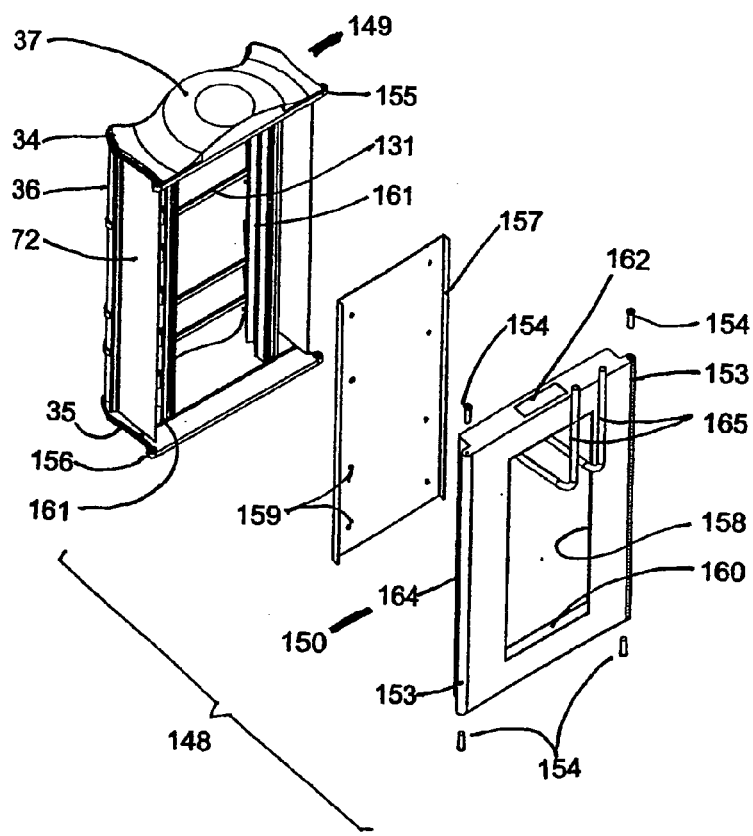
FIG. 28 shows an oblique rear exploded view of wall mounted version.

Wall mounting allows utility service lines 165 to be supplied through the wall to the wall mounting bracket 150. Thus, as shown in FIGS. 26 and 27, in the wall mounted version 148, utility service lines 165 enter the wall mounting bracket 150 either through its mounting point on the wall or through an external wall chase 163 and associated wiring access plate 162 in wall mounting bracket 150, combining the utility connection 32 and the support 33. In the wall mounted version 148, the support 33 is a wall mounting bracket 150 that permits an installer to rough in the utility connections and finish the rough, structural installation before the delicate main wall module 149 is set in place and connected. The wall mounting bracket 150 can be similar in construction to a typical breaker panel that will enclose all wiring and connections. The wall mounting bracket 150 has two lateral extensions 153 that accommodate a pivoting mechanism and fastening means.

After the wall mounting bracket 150 has been installed, the main wall module 149 is anchored to the wall mounting bracket by means of hinge pins, such as two removable locking bolts 154 that are installed through upper and lower mounting lugs 155 and 156 in the main wall module 149. Once secured in this manner, the main wall module 149 is connected to the utilities in wiring areas 161. Later, when the wall mounted version 148 is serviced or repaired, or when additional outlets are installed in the field, the main wall module 149 can be pivoted on its locking bolts 154 that serve as hinge pins, to facilitate access. As shown in FIG. 26 and 27, the installation may be completed by rotating the main wall module 149 into position against the wall mounting bracket 150 and securing it by locking bolts 154 that may be inserted through the upper and lower mounting lugs 155 and 156 into corresponding holes in the lateral extensions 153 in the all mounting bracket 150. A back panel 157 can be attached to the inside of the main wall module 149 to close the central opening and prevent care giver access to the inside of the wall mounting bracket where the utility service lines are connected.

The wall mounted version 148 has side panels 72 that are attached to the closure flanges 73 of the cores 51 and overlap, and are supported by, the side surfaces 164 of the wall mounting bracket 150 when the wall mounted version 148 is closed and in operation.

The wall mounted version 148 has vertical spacers 36 on which contoured mounting rails 131 may be attached by means of rail mounting clamps 140. Patient support equipment and accessories, such as shown in FIG. 22, may be fitted with rail adapter clamps 144 to be used in the wall mounted version 148. Modularization and standardization of contoured equipment rails 131 and adapter clamps 144 allows the sharing of equipment resources among a hospital's different care units and patient rooms that use open medical systems 30 in free-standing, wall mounted or ceiling supported versions, contributing to improved equipment utilization rates and resulting savings.

As shown in FIGS. 2, 26e and 26f, an upper and lower transom 127, 128, with covered access openings 130, wiring compartments 239, contoured rails 131 and 201, brackets 253 supporting optional lighting components 252, and upper and lower covers 37, 290 can also be used in wall mounted versions 148.

FIGS. 26b, 26c and 26g show an alternative embodiment of the wall mounting bracket 150 comprising two wall traverses 262 and two vertical back plates 280 that are assembled, by welding, riveting or using other common assembly methods, to form a rectangular frame. Each wall traverse 262 incorporates one or more cutouts 264 that, preferably, are rectangular but can also be round, triangular or polygonal.

The facility's electrical wiring and gas service lines 168 are brought from inside the wall through cutouts 264 into the wall-mounted version 148. The vertical back plates 280 have a plurality of mounting holes 152 for attaching the wall mounting bracket 150 to a wall, using connectors 152, such as bolts, in conjunction with, as may be appropriate, wall anchors or other hardware typically used in building construction and improvement. Two upper support brackets 265 and two lower support brackets 266, from which the main wall module 149 is suspended during final installation, are also attached to the wall mounting bracket 150. Each support bracket 265, 266 incorporates a locating pin 267 that points upward to engage a recess 268 on the underside 269 of the plate 34 and the outer surface 40 of the plate 35.

For safety during installation, the locating pins 267, in engagement with recesses 268 of the plates 34 and 35, temporarily secure the wall mounted version 148 and prevent it from sliding off its support brackets 265, 266 while the installation is being completed. The support brackets 256, 266 will continue to support the wall mounted version 148 from the wall mounting frame 150 by engagement with plates 34, 35 during use of the wall mounted version after installation.

The support brackets 265, 266 alternatively may be attached to the wall traverses 262, the vertical back plates 280, or be formed as an integral part of the vertical back plates 280 or the wall traverses 262. The locating pins 267 of the support brackets 265, 266 may, alternatively, be formed as an integral part of, or attached to, the support brackets 265, 266, the vertical back plates 280, or the wall traverses 262.

The wall mounted version 148 is removably attached to a wall in a medical facility, such as by wall connectors 270. Additionally, fasteners such as screws inserted through slots 271 of each security flange 272 of the wall traverses 262, may be used to tighten the security flanges 272 against the transom end plates 273. Using one or more holes 274 in the security flanges 272 as a drilling template, the installer may, at his or her option, drill through the transom end plates 273 and install screws, rivets, or other similar fasteners in holes 274 to permanently align and lock the security flanges 272 to the transom end plates 273 in order to secure the installation and prevent the wall mounted version 148 from shifting away from its final installed position during use.

One of the recesses 268, which receive and retain the locating pins 267 that secure the wall mounting version 148 to the wall mounting bracket 150 during installation, can be clearly seen in FIGS. 26a and 26f, which show an upside-down view of plate 34, that reveals the wire compartments 239 and a transom end plate 273.

FIG. 26a shows an end view of a core 51 of a wall mounted version 148. The alternative wall mounted version 148 has two cores 51, and each core is comprised of an individual base module 52, and a side panel 72, and two spacers 36 interposed between plates 34, 35 to comprise a main assembly 32. During final installation when the job site is clean, the main assembly 32 of the wall mounted version 148 is attached to the wall mounting bracket 150 such that the locking flange 57 of each core 51 mates to a flange 281 of a vertical back plate 280, and the locking flange 57 of the chase module 237 also mates to the inner surface 282 of the vertical back plate 280 to form an enclosed volume that will serve as a cable raceway. One or more optional outlets 63 can be installed through appropriate openings 58 in side panel 72 using the grooves 64 on the mounting surface 221 of ribs 219.

As seen in FIG. 26a, the interdigitation of the pivot flange 217 of the base module 52 and the yoke 214 on the side flange 74 of the side panel 72 creates a pivot that enables the side panel 72 to be rotated from an open position 283 to a closed position 284 where the locking flange 57 of the side panel 72 comes to rest against flange 281 of the vertical back plate 280. Fasteners such as screws 286, quarter-turn latches or other closing hardware may be used to fasten the locking flange 57 of side panel 72 to the flange 281 of the back panel 280.

We claim:

1. An open medical system for deploying, supporting and organizing medical equipment and medical utilities, comprising:
    a main assembly having
        an upper plate having upper and lower surfaces,
        a lower plate having upper and lower surfaces,
            said upper and lower plates being elongated so as to define a first end and a second end thereof, said upper and lower plates further including a front edge and a rear edge,
        a plurality of vertically extending structural spacers secured between said lower surface of said upper plate and said upper surface of said lower plate so as to maintain said upper and lower plate in fixed spaced apart relation, and
        first and second vertically extending opposing utility cores respectively extending between said lower surface of said upper plate and said upper surface of said lower plate at said first and second ends thereof, each of said utility cores having an inner surface and at least one utility outlet located on said respective inner surface, said lower surface of said upper plate, said upper surface of said lower plate and said inner surfaces of said utility cores bounding an open work space wherein no structural elements are located within said open work space between said front and rear edges of said upper and lower plates, said utility outlets having an outlet surface at least partially facing said work space and being accessible from within said work space by medical personnel; and
    a utility connection for connecting utilities to said respective first and second utility cores.

2. The open medical system of claim 1 in which the system has a frontal plane, and said outlet surfaces are angled between 20 and 70 degrees inwardly in relation to the frontal plane.

3. The open medical system of claim 1 in which the main assembly is supported by a base assembly attached to the lower plate, which base assembly allows the main assembly to rotate.

4. The open medical system of claim 3 in which the rotation of the main assembly is restricted to between 0 and 180 degrees in each direction from the orientation upon installation.

5. The open medical system of claim 1, having at least one movable contoured equipment rail, in which the contoured equipment rail has two ends, a straight rear segment and two angled segments, one on each end, such that the end of the contoured rail may be attached to a spacer, and the angled segments follow the general shape of the core closest to the angled segment on each end of the rail.

6. The open medical system of claim 5 in which the system has a side-to-side axis, and in which the contoured rail is attached at each end to, and extends between, two spacers aligned so that a line drawn between the two spacers would be approximately parallel to the side-to-side axis of the system.

7. The open medical system of claim 1 further comprising a wall-mounting bracket for supporting said main assembly by attachment to a wall of a medical facility and in which the wall-mounting bracket is separable from the main assembly and has a plurality of lateral extensions on which the main assembly may be removably mounted.

8. The open medical system of claim 1 in which the lower plate has two long edges and at least one of the long edges is contoured to provide an indentation which allows medical equipment supported on the system to extend below the lower plate.

9. The open medical system of claim 1 in which the open work space is at least 19.44 cm (36 inches) in size between the upper and lower plate, and 30.48 cm (12 inches) in size between the outlet surfaces.

10. The open medical system of claim 1 in which the open work space extends upward to a height approximately of the reach of a female of the 5th percentile, and downward from the height at least 91.44 cm (36 inches).

* * * * *